(12) United States Patent
Schipper et al.

(10) Patent No.: US 11,499,090 B2
(45) Date of Patent: Nov. 15, 2022

(54) OXIDIZERS FOR CARBON DIOXIDE-BASED FRACTURING FLUIDS

(71) Applicant: Saudi Arabian Oil Company, Dhahran (SA)

(72) Inventors: Desmond Schipper, Houston, TX (US); Katherine Leigh Hull, Houston, TX (US); Rajesh Kumar Saini, Cypress, TX (US); Younane N. Abousleiman, Norman, OK (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/936,215

(22) Filed: Jul. 22, 2020

(65) Prior Publication Data

US 2021/0024814 A1   Jan. 28, 2021

Related U.S. Application Data

(60) Provisional application No. 62/878,060, filed on Jul. 24, 2019.

(51) Int. Cl.
*C09K 8/68* (2006.01)
*C09K 8/70* (2006.01)
(Continued)

(52) U.S. Cl.
CPC .............. *C09K 8/68* (2013.01); *C09K 8/665* (2013.01); *C09K 8/703* (2013.01); *C09K 8/706* (2013.01);
(Continued)

(58) Field of Classification Search
CPC ........ C10G 27/00; C10G 27/04; C10G 27/06; C10G 27/10; C10G 27/12; C10G 1/00;
(Continued)

(56) References Cited

U.S. PATENT DOCUMENTS 701,154 A    5/1902   Cole
830,437 A    9/1906   Humphrey
(Continued)

FOREIGN PATENT DOCUMENTS

CA    2322118    12/2007
CA    2635868    12/2008
(Continued)

OTHER PUBLICATIONS

Kotai et al., Beliefs and Facts in Permanganate Chemistry—An Overview on the Synthesis and the Reactivity of Simple and Complex Permanganates, 2009, Trends in Inorganic Chemistry, vol. 11 (Year: 2009).*

(Continued)

*Primary Examiner* — Angela M DiTrani Leff
(74) *Attorney, Agent, or Firm* — Fish & Richardson P.C.

(57) ABSTRACT

A method for treating kerogen in a subterranean zone which includes the use of supercritical carbon dioxide or emulsions of liquid carbon dioxide and an aqueous fluid. The carbon dioxide or emulsions can further include oxidizers. The oxidizers can include inorganic oxidizers or organic oxidizers, for example an oxidizer including an organic cation and an oxidizing anion. Additional additives such as polymers, crosslinkers, clay inhibitors, scale inhibitors and corrosion inhibitors can further enhance the efficiency of the kerogen-treating carbon dioxide or emulsion.

21 Claims, 4 Drawing Sheets

(51) Int. Cl.
*C09K 8/66* (2006.01)
*C09K 8/80* (2006.01)
*E21B 43/26* (2006.01)
*E21B 37/06* (2006.01)
*E21B 41/02* (2006.01)

(52) U.S. Cl.
CPC ............... *C09K 8/80* (2013.01); *E21B 43/26* (2013.01); *E21B 37/06* (2013.01); *E21B 41/02* (2013.01)

(58) Field of Classification Search
CPC . C10G 1/04; C09K 8/68; C09K 8/665; C09K 8/703; C09K 8/706; C09K 8/80; E21B 43/26; E21B 37/06; E21B 41/02
See application file for complete search history.

(56) References Cited

U.S. PATENT DOCUMENTS

| | | |
|---|---|---|
| 2,900,269 A | 8/1959 | Bauman et al. |
| 3,284,281 A | 11/1966 | Thomas |
| 3,316,965 A | 5/1967 | Watanabe |
| 3,456,183 A | 7/1969 | Codrington et al. |
| 3,616,855 A | 11/1971 | Colgate |
| 3,690,622 A | 9/1972 | Brunner |
| 3,716,387 A | 2/1973 | Simmons et al. |
| 3,807,557 A | 4/1974 | Miller |
| 3,834,122 A | 9/1974 | Allison et al. |
| 3,912,330 A | 10/1975 | Carnahan et al. |
| 3,926,575 A | 12/1975 | Meyers |
| 3,977,472 A | 8/1976 | Graham et al. |
| 3,996,062 A | 12/1976 | Frost |
| 4,043,599 A | 8/1977 | Lingane |
| 4,043,885 A | 8/1977 | Yen et al. |
| 4,047,988 A | 9/1977 | Weill |
| 4,108,965 A * | 8/1978 | Christe ............... C01B 21/083 149/119 |
| 4,195,010 A | 3/1980 | Russell et al. |
| 4,220,550 A | 9/1980 | Frenier et al. |
| 4,223,726 A | 9/1980 | Cha |
| 4,252,189 A | 2/1981 | Bodine |
| 4,289,639 A | 9/1981 | Buske |
| 4,324,560 A | 4/1982 | Fonseca |
| 4,381,950 A | 5/1983 | Lawson |
| 4,444,058 A | 4/1984 | Ratigan |
| 4,480,696 A | 11/1984 | Almond et al. |
| 4,485,071 A | 11/1984 | Larter |
| 4,493,875 A | 1/1985 | Beck et al. |
| 4,587,739 A | 5/1986 | Holcomb |
| 4,594,170 A | 6/1986 | Brown et al. |
| 4,629,702 A | 12/1986 | Fan et al. |
| 4,640,692 A | 2/1987 | Audeh |
| 4,681,914 A | 7/1987 | Olson et al. |
| 4,708,805 A | 11/1987 | D'Muhala |
| 4,718,489 A | 1/1988 | Hallam et al. |
| 4,780,223 A | 10/1988 | Baranet et al. |
| 4,830,773 A | 5/1989 | Olson |
| 4,830,779 A | 5/1989 | Maeno et al. |
| 4,864,472 A | 9/1989 | Yoshimura |
| 4,882,128 A | 11/1989 | Hukvari et al. |
| 4,887,670 A | 12/1989 | Lord et al. |
| 5,031,700 A | 7/1991 | McDougall et al. |
| 5,180,556 A | 1/1993 | Nolte et al. |
| 5,193,396 A | 3/1993 | Gorski |
| 5,199,490 A | 4/1993 | Surles et al. |
| 5,213,705 A | 5/1993 | Olson |
| 5,224,543 A | 7/1993 | Watkins |
| 5,232,490 A | 8/1993 | Bender et al. |
| 5,251,286 A | 10/1993 | Wiener et al. |
| 5,302,297 A | 4/1994 | Barthrope |
| 5,390,529 A | 2/1995 | Ghiselli |
| 5,435,187 A | 7/1995 | Ewy |
| 5,604,184 A | 2/1997 | Ellis et al. |
| 5,757,473 A | 5/1998 | Kanduth et al. |
| 5,759,964 A | 6/1998 | Shuchart |
| 5,869,750 A | 2/1999 | Onan |
| 5,999,887 A | 12/1999 | Giannakopoulos et al. |
| 6,076,046 A | 6/2000 | Vassudevan |
| 6,095,679 A | 8/2000 | Hammiche et al. |
| 6,131,661 A | 10/2000 | Conner et al. |
| 6,138,760 A | 10/2000 | Lopez et al. |
| 6,140,816 A | 10/2000 | Heron et al. |
| 6,143,698 A | 11/2000 | Murphey et al. |
| 6,165,295 A | 12/2000 | Wagaman |
| 6,227,295 B1 | 5/2001 | Mitchell et al. |
| 6,349,595 B1 | 2/2002 | Lorenzo et al. |
| 6,411,902 B1 | 6/2002 | Wiltshire |
| 6,488,091 B1 | 12/2002 | Weaver |
| 6,491,425 B1 | 12/2002 | Hammiche et al. |
| 6,494,263 B2 | 12/2002 | Todd |
| 6,516,080 B1 | 2/2003 | Nur |
| 6,579,572 B2 | 6/2003 | Espin et al. |
| 6,652,682 B1 | 11/2003 | Fawls |
| 6,694,262 B2 | 2/2004 | Rozak |
| 6,705,398 B2 | 3/2004 | Weng |
| 6,715,553 B2 | 4/2004 | Reddy et al. |
| 6,729,409 B1 | 5/2004 | Gupta et al. |
| 6,749,022 B1 | 6/2004 | Fredd |
| 6,776,235 B1 | 8/2004 | England |
| 6,832,158 B2 | 12/2004 | Mese |
| 6,846,420 B2 | 1/2005 | Reddy et al. |
| 6,866,048 B2 | 3/2005 | Mattox |
| 6,884,760 B1 | 4/2005 | Brand et al. |
| 6,947,843 B2 | 9/2005 | Fisher et al. |
| 6,989,391 B2 | 1/2006 | Funkhouser |
| 7,007,752 B2 | 3/2006 | Reddy et al. |
| 7,011,154 B2 | 3/2006 | Maher et al. |
| 7,044,220 B2 | 5/2006 | Nguyen et al. |
| 7,086,484 B2 | 8/2006 | Smith |
| 7,098,663 B1 | 8/2006 | Bader |
| 7,210,528 B1 | 5/2007 | Brannon et al. |
| 7,255,169 B2 | 8/2007 | Van Batenburg et al. |
| 7,261,158 B2 | 8/2007 | Middaugh et al. |
| 7,281,580 B2 | 10/2007 | Parker et al. |
| 7,281,581 B2 | 10/2007 | Nyuyen et al. |
| 7,326,670 B2 | 2/2008 | DiLullo et al. |
| 7,334,635 B2 | 2/2008 | Nguyen |
| 7,334,636 B2 | 2/2008 | Nguyen |
| 7,344,889 B2 | 3/2008 | Kelemen et al. |
| 7,369,980 B2 | 5/2008 | Deffenbaugh et al. |
| 7,424,911 B2 | 9/2008 | McCarthy et al. |
| 7,451,812 B2 | 11/2008 | Cooper et al. |
| 7,472,748 B2 | 1/2009 | Gdanski et al. |
| 7,472,751 B2 | 1/2009 | Brannon et al. |
| 7,491,444 B2 | 2/2009 | Smith et al. |
| 7,500,517 B2 | 3/2009 | Looney et al. |
| 7,513,306 B2 | 4/2009 | Pfefferle et al. |
| 7,526,418 B2 | 4/2009 | Pita et al. |
| 7,527,097 B2 | 5/2009 | Patel |
| 7,565,831 B2 | 7/2009 | Miyahara |
| 7,571,767 B2 | 8/2009 | Parker et al. |
| 7,581,590 B2 | 9/2009 | Lesko et al. |
| 7,588,085 B2 | 9/2009 | Acock et al. |
| 7,621,173 B2 | 11/2009 | Hsu |
| 7,642,223 B2 | 1/2010 | Santra et al. |
| 7,645,883 B1 | 1/2010 | Hawkins et al. |
| 7,654,159 B2 | 2/2010 | Enoksson |
| 7,678,723 B2 | 3/2010 | Duenckel et al. |
| 7,703,531 B2 | 4/2010 | Huang |
| 7,770,647 B2 | 8/2010 | Watson et al. |
| 7,771,549 B1 | 8/2010 | Christe et al. |
| 7,789,164 B2 | 9/2010 | Looney et al. |
| 7,803,740 B2 | 9/2010 | Bicerano et al. |
| 7,825,053 B2 | 11/2010 | Duenckel et al. |
| 7,857,055 B2 | 12/2010 | Li |
| 7,867,613 B2 | 1/2011 | Smith et al. |
| 7,878,248 B2 | 2/2011 | Abad et al. |
| 7,887,918 B2 | 2/2011 | Smith et al. |
| 7,918,277 B2 | 4/2011 | Brannon et al. |
| 7,921,911 B2 | 4/2011 | Fuller et al. |
| 7,983,845 B2 | 7/2011 | Minh |
| 8,003,212 B2 | 8/2011 | Smith et al. |
| 8,003,577 B2 | 8/2011 | Li et al. |

(56) References Cited

U.S. PATENT DOCUMENTS

| | | |
|---|---|---|
| 8,006,760 B2 | 8/2011 | Fleming et al. |
| 8,047,288 B2 | 11/2011 | Skala et al. |
| 8,061,424 B2 | 11/2011 | Willberg et al. |
| 8,066,068 B2 | 11/2011 | Lesko et al. |
| 8,081,802 B2 | 12/2011 | Dvorkin et al. |
| 8,104,536 B2 | 1/2012 | Looney et al. |
| 8,119,576 B2 | 2/2012 | Reyes et al. |
| 8,127,850 B2 | 3/2012 | Brannon et al. |
| 8,146,416 B2 | 4/2012 | Pisio et al. |
| 8,165,817 B2 | 4/2012 | Betancourt et al. |
| 8,177,422 B2 | 5/2012 | Kjoller et al. |
| 8,205,675 B2 | 6/2012 | Brannon et al. |
| 8,216,675 B2 | 7/2012 | Palamara et al. |
| 8,225,866 B2 | 7/2012 | Rouffignac et al. |
| 8,278,931 B2 | 10/2012 | Fang et al. |
| 8,352,228 B2 | 1/2013 | Walters et al. |
| 8,380,437 B2 | 2/2013 | Abousleiman et al. |
| 8,408,305 B2 | 4/2013 | Brannon et al. |
| 8,473,213 B2 | 6/2013 | Zhu et al. |
| 8,490,700 B2 | 7/2013 | Lesko et al. |
| 8,606,524 B2 | 12/2013 | Soliman et al. |
| 8,614,157 B2 | 12/2013 | Pope et al. |
| 8,614,573 B2 | 12/2013 | Minh |
| 8,616,294 B2 | 12/2013 | Zubrin et al. |
| 8,636,065 B2 | 1/2014 | Lesko et al. |
| 8,701,788 B2 | 4/2014 | Wigand et al. |
| 8,729,903 B2 | 5/2014 | Srnka et al. |
| 8,731,889 B2 | 5/2014 | Du et al. |
| 8,757,259 B2 | 6/2014 | Lesko et al. |
| 8,763,699 B2 | 7/2014 | Medvedev et al. |
| 8,763,703 B2 | 7/2014 | Saini et al. |
| 8,796,187 B2 | 8/2014 | Reyes et al. |
| 8,821,806 B2 | 9/2014 | Hersherwitz et al. |
| 8,822,386 B2 | 9/2014 | Quintero et al. |
| 8,835,363 B2 | 9/2014 | Amanullah et al. |
| 8,839,860 B2 | 9/2014 | Wigand et al. |
| 8,844,366 B2 | 9/2014 | Warren |
| 8,851,177 B2 | 10/2014 | Wigand |
| 8,865,482 B2 | 10/2014 | Wang et al. |
| 8,868,385 B2 | 10/2014 | Fertig et al. |
| 8,883,693 B2 | 11/2014 | Eldred et al. |
| 8,936,083 B2 | 1/2015 | Nguyen |
| 8,936,089 B2 | 1/2015 | Wigand |
| 8,967,249 B2 | 3/2015 | Akkurt et al. |
| 9,006,151 B2 | 4/2015 | Amanullah et al. |
| 9,006,153 B2 | 4/2015 | Lin et al. |
| 9,033,033 B2 | 5/2015 | Thomas et al. |
| 9,033,043 B2 | 5/2015 | Hinkel |
| 9,046,509 B2 | 6/2015 | Dvorkin et al. |
| 9,057,797 B2 | 6/2015 | Omeragic et al. |
| 9,080,440 B2 | 7/2015 | Panga et al. |
| 9,085,727 B2 | 7/2015 | Litvinets et al. |
| 9,097,818 B2 | 8/2015 | Hursan |
| 9,128,210 B2 | 9/2015 | Pomerantz |
| 9,133,398 B2 | 9/2015 | Wigand et al. |
| 9,152,745 B2 | 10/2015 | Glinsky |
| 9,297,244 B2 | 3/2016 | Mahoney et al. |
| 9,523,268 B2 | 12/2016 | Potapenko et al. |
| 9,644,137 B2 | 5/2017 | Dean et al. |
| 9,664,018 B2 | 5/2017 | Vandeponseele et al. |
| 9,670,764 B2 | 6/2017 | Lesko et al. |
| 9,688,904 B2 | 6/2017 | Wang et al. |
| 9,696,270 B1 | 7/2017 | Roy et al. |
| 9,725,645 B2 | 8/2017 | Monastiriotis et al. |
| 9,753,016 B1 | 9/2017 | Daugela |
| 9,784,882 B2 | 10/2017 | Vinegar et al. |
| 9,816,365 B2 | 11/2017 | Nguyen et al. |
| 9,834,721 B2 | 12/2017 | Chang et al. |
| 9,845,670 B2 | 12/2017 | Surjaatadja et al. |
| 9,863,211 B2 | 1/2018 | Gamage et al. |
| 9,863,230 B2 | 1/2018 | Litvinets et al. |
| 9,863,231 B2 | 1/2018 | Hull et al. |
| 9,869,649 B2 | 1/2018 | Hull et al. |
| 9,885,691 B1 | 2/2018 | Daugela |
| 9,895,670 B2 | 2/2018 | Anders et al. |
| 9,896,919 B1 | 2/2018 | Chen |
| 9,902,898 B2 | 2/2018 | Nelson et al. |
| 9,909,404 B2 | 3/2018 | Hwang et al. |
| 9,927,344 B2 | 3/2018 | Chertov |
| 9,945,220 B2 | 4/2018 | Saini et al. |
| 9,995,125 B2 | 6/2018 | Madasu et al. |
| 9,995,220 B2 | 6/2018 | Hawie et al. |
| 10,001,769 B2 | 6/2018 | Huang et al. |
| 10,023,782 B2 | 7/2018 | Wang et al. |
| 10,030,495 B2 | 7/2018 | Litvinets et al. |
| 10,047,281 B2 | 8/2018 | Nguyen et al. |
| 10,066,149 B2 | 9/2018 | Li et al. |
| 10,077,396 B2 | 9/2018 | Nguyen et al. |
| 10,087,364 B2 | 10/2018 | Kaufman et al. |
| 10,113,396 B2 | 10/2018 | Nelson et al. |
| 10,151,715 B2 | 12/2018 | Hull et al. |
| 10,273,398 B2 | 4/2019 | Liu et al. |
| 10,329,478 B2 | 6/2019 | Schnoor et al. |
| 10,351,758 B2 | 7/2019 | Hull et al. |
| 10,379,068 B2 | 8/2019 | Hull et al. |
| 10,415,367 B2 | 9/2019 | Galford |
| 10,421,897 B2 | 9/2019 | Skiba et al. |
| 10,472,555 B2 | 11/2019 | Hutchins et al. |
| 10,479,927 B2 | 11/2019 | Hull et al. |
| 10,550,314 B2 | 2/2020 | Liang et al. |
| 10,611,967 B2 | 4/2020 | Inan |
| 2002/0003115 A1 | 1/2002 | Conaway et al. |
| 2003/0209248 A1 | 11/2003 | Ward |
| 2003/0212465 A1 | 11/2003 | Howard et al. |
| 2004/0101457 A1 | 5/2004 | Pahlman et al. |
| 2004/0211567 A1 | 10/2004 | Aud |
| 2005/0039919 A1 | 2/2005 | Harris et al. |
| 2005/0059558 A1 | 3/2005 | Blauch |
| 2005/0060130 A1 | 3/2005 | Shapiro et al. |
| 2005/0103118 A1 | 5/2005 | Workman |
| 2005/0274523 A1 | 12/2005 | Brannon et al. |
| 2006/0047489 A1 | 3/2006 | Scheidt et al. |
| 2006/0092766 A1 | 5/2006 | Shelley et al. |
| 2006/0265204 A1 | 11/2006 | Wallis et al. |
| 2007/0054054 A1 | 3/2007 | Svoboda et al. |
| 2007/0087940 A1 | 4/2007 | Qu et al. |
| 2007/0203677 A1 | 8/2007 | Awwiller |
| 2007/0235181 A1 | 10/2007 | Lecampion et al. |
| 2007/0298979 A1 | 12/2007 | Perry et al. |
| 2008/0006410 A1 | 1/2008 | Looney et al. |
| 2008/0059140 A1 | 3/2008 | Salmon et al. |
| 2008/0070806 A1 | 3/2008 | Lin et al. |
| 2008/0081771 A1 | 4/2008 | Lin et al. |
| 2008/0093073 A1 | 4/2008 | Bustos et al. |
| 2008/0217012 A1* | 9/2008 | Delorey ............... C09K 8/703 166/300 |
| 2008/0234147 A1 | 9/2008 | Li et al. |
| 2009/0032252 A1 | 2/2009 | Boney et al. |
| 2009/0044945 A1 | 2/2009 | Wilberg et al. |
| 2009/0071239 A1 | 3/2009 | Rojas et al. |
| 2009/0087912 A1 | 4/2009 | Ramos et al. |
| 2009/0143252 A1 | 6/2009 | Lehmann |
| 2009/0145607 A1 | 6/2009 | Li et al. |
| 2009/0193881 A1 | 8/2009 | Finnberg |
| 2009/0203557 A1 | 8/2009 | Barnes et al. |
| 2009/0242196 A1 | 10/2009 | Pao |
| 2009/0248309 A1 | 10/2009 | Nelville et al. |
| 2009/0253595 A1 | 10/2009 | Qu |
| 2009/0283257 A1 | 11/2009 | Becker |
| 2009/0313772 A1 | 12/2009 | Talley |
| 2010/0010106 A1 | 1/2010 | Crews |
| 2010/0044049 A1* | 2/2010 | Leshchyshyn ........... C09K 8/88 166/308.1 |
| 2010/0049625 A1 | 2/2010 | Biebesheimer et al. |
| 2010/0051511 A1 | 3/2010 | Faerman |
| 2010/0121623 A1 | 5/2010 | Yogeswaren |
| 2010/0126936 A1* | 5/2010 | Jones .................... E21B 21/063 210/708 |
| 2010/0128982 A1 | 5/2010 | Dvorkin et al. |
| 2010/0186520 A1 | 7/2010 | Wheeler |
| 2010/0213579 A1 | 8/2010 | Henry |
| 2010/0224365 A1 | 9/2010 | Abad |
| 2010/0243242 A1 | 9/2010 | Boney et al. |

(56) References Cited

U.S. PATENT DOCUMENTS

| | | | |
|---|---|---|---|
| 2010/0243248 A1* | 9/2010 | Golomb | C09K 8/58 |
| | | | 166/270 |
| 2010/0258265 A1 | 10/2010 | Karanikas et al. | |
| 2010/0263867 A1 | 10/2010 | Horton et al. | |
| 2010/0276142 A1 | 11/2010 | Skildum et al. | |
| 2010/0279136 A1 | 11/2010 | Bonucci | |
| 2010/0323933 A1 | 12/2010 | Fuller et al. | |
| 2011/0005969 A1* | 1/2011 | Giffin | C09K 8/706 |
| | | | 208/14 |
| 2011/0065612 A1 | 3/2011 | Stokes et al. | |
| 2011/0257944 A1 | 10/2011 | Du et al. | |
| 2011/0259588 A1 | 10/2011 | Ali | |
| 2012/0018159 A1 | 1/2012 | Gulta et al. | |
| 2012/0026037 A1 | 2/2012 | Thomson et al. | |
| 2012/0129737 A1 | 5/2012 | Lesko et al. | |
| 2012/0160486 A1* | 6/2012 | Wigand | C10G 9/00 |
| | | | 166/279 |
| 2012/0179444 A1 | 7/2012 | Ganguly et al. | |
| 2012/0193578 A1 | 8/2012 | Pan et al. | |
| 2012/0247774 A1 | 10/2012 | Li et al. | |
| 2012/0261129 A1 | 10/2012 | Becker | |
| 2012/0261617 A1 | 10/2012 | Pan et al. | |
| 2012/0267102 A1 | 10/2012 | Huang et al. | |
| 2012/0305247 A1 | 12/2012 | Chen et al. | |
| 2012/0318498 A1 | 12/2012 | Parsche | |
| 2013/0013209 A1 | 1/2013 | Zhu et al. | |
| 2013/0056213 A1 | 3/2013 | Medvedev et al. | |
| 2013/0084643 A1 | 4/2013 | Commarieu et al. | |
| 2013/0137610 A1 | 5/2013 | Huang | |
| 2013/0160994 A1 | 6/2013 | Alsop et al. | |
| 2013/0161002 A1* | 6/2013 | Wigand | C09K 8/592 |
| | | | 166/279 |
| 2013/0161003 A1 | 6/2013 | Mikhailovich et al. | |
| 2013/0213120 A1 | 8/2013 | Lebedev | |
| 2013/0213638 A1 | 8/2013 | Keller | |
| 2013/0228019 A1 | 9/2013 | Meadows | |
| 2013/0231908 A1 | 9/2013 | Williams et al. | |
| 2013/0233536 A1 | 9/2013 | Alqam | |
| 2013/0238304 A1 | 9/2013 | Glinsky | |
| 2013/0269933 A1 | 10/2013 | Pomerantz et al. | |
| 2013/0274149 A1 | 10/2013 | Lafitte et al. | |
| 2013/0275099 A1 | 10/2013 | Frydman | |
| 2013/0306321 A1 | 11/2013 | Lanctot-Downs et al. | |
| 2013/0341028 A1 | 12/2013 | Christian et al. | |
| 2014/0008305 A1 | 1/2014 | Nichols et al. | |
| 2014/0027109 A1 | 1/2014 | Al-Baraik | |
| 2014/0045732 A1 | 2/2014 | Mazyar | |
| 2014/0048694 A1 | 2/2014 | Pomerantz | |
| 2014/0090850 A1 | 4/2014 | Benicewicz | |
| 2014/0096964 A1 | 4/2014 | Chakraborty et al. | |
| 2014/0116710 A1 | 5/2014 | Naser-El-Din et al. | |
| 2014/0221257 A1 | 8/2014 | Roddy | |
| 2014/0231077 A1 | 8/2014 | Rivero et al. | |
| 2014/0243246 A1 | 8/2014 | Hendrickson | |
| 2014/0247997 A1 | 9/2014 | Nishyama | |
| 2014/0251605 A1 | 9/2014 | Hera | |
| 2014/0260694 A1 | 9/2014 | Szlendak | |
| 2014/0364343 A1 | 12/2014 | Nelson et al. | |
| 2014/0367100 A1 | 12/2014 | Oliveria et al. | |
| 2014/0374104 A1 | 12/2014 | Kushal | |
| 2015/0019183 A1 | 1/2015 | Suzuki | |
| 2015/0041136 A1 | 2/2015 | Martin | |
| 2015/0055438 A1 | 2/2015 | Yan et al. | |
| 2015/0057097 A1 | 2/2015 | Cho | |
| 2015/0057196 A1 | 2/2015 | Debord | |
| 2015/0065398 A1 | 3/2015 | Gartland et al. | |
| 2015/0068749 A1* | 3/2015 | Wernimont | E21B 43/255 |
| | | | 166/300 |
| 2015/0071750 A1 | 3/2015 | Foster | |
| 2015/0072902 A1 | 3/2015 | Lafitte et al. | |
| 2015/0075782 A1 | 3/2015 | Sharma | |
| 2015/0083405 A1 | 3/2015 | Dobroskok | |
| 2015/0083420 A1* | 3/2015 | Gupta | E21B 43/267 |
| | | | 166/280.2 |
| 2015/0152724 A1 | 6/2015 | Amendt | |
| 2015/0167440 A1 | 6/2015 | Kasevich | |
| 2015/0192005 A1 | 7/2015 | Saeedfar | |
| 2015/0259593 A1 | 9/2015 | Kaufman et al. | |
| 2015/0284625 A1 | 10/2015 | Silveira | |
| 2015/0293256 A1 | 10/2015 | Dusterhoft | |
| 2015/0300140 A1 | 10/2015 | Eoff et al. | |
| 2015/0322759 A1 | 11/2015 | Okoniewski | |
| 2015/0368541 A1 | 12/2015 | Monclin et al. | |
| 2016/0017202 A1 | 1/2016 | Yang et al. | |
| 2016/0061017 A1 | 3/2016 | Nguyen et al. | |
| 2016/0103047 A1 | 4/2016 | Liu | |
| 2016/0103049 A1 | 4/2016 | Liu | |
| 2016/0130496 A1 | 5/2016 | Holtsclaw et al. | |
| 2016/0137904 A1 | 5/2016 | Drake | |
| 2016/0177674 A1 | 6/2016 | Shetty et al. | |
| 2016/0208591 A1 | 7/2016 | Weaver et al. | |
| 2016/0215202 A1 | 7/2016 | Weaver et al. | |
| 2016/0215205 A1 | 7/2016 | Nguyen | |
| 2016/0256583 A1 | 9/2016 | Yamada | |
| 2016/0265331 A1 | 9/2016 | Weng et al. | |
| 2016/0289543 A1 | 10/2016 | Chang et al. | |
| 2016/0362965 A1 | 12/2016 | Parlar et al. | |
| 2017/0015895 A1 | 1/2017 | Cox | |
| 2017/0051598 A1 | 2/2017 | Ouenes | |
| 2017/0066959 A1* | 3/2017 | Hull | C09K 8/665 |
| 2017/0066962 A1 | 3/2017 | Ravi et al. | |
| 2017/0067836 A1 | 3/2017 | Hull et al. | |
| 2017/0137703 A1 | 5/2017 | Leverson et al. | |
| 2017/0145303 A1 | 5/2017 | Fontenelle et al. | |
| 2017/0145793 A1 | 5/2017 | Ouenes | |
| 2017/0176639 A1 | 6/2017 | Mosse et al. | |
| 2017/0198207 A1 | 7/2017 | Li et al. | |
| 2017/0247997 A1 | 8/2017 | Kovalevsky | |
| 2017/0248011 A1 | 8/2017 | Craddock et al. | |
| 2017/0275525 A1 | 9/2017 | Koep et al. | |
| 2017/0328179 A1 | 11/2017 | Dykatra et al. | |
| 2017/0336528 A1 | 11/2017 | Badri et al. | |
| 2017/0370197 A1 | 12/2017 | Han et al. | |
| 2018/0112126 A1 | 4/2018 | Yang et al. | |
| 2018/0155602 A1 | 6/2018 | Zhang | |
| 2018/0155615 A1 | 6/2018 | Rahy et al. | |
| 2018/0195982 A1 | 7/2018 | Hull et al. | |
| 2018/0305208 A1 | 10/2018 | Mason | |
| 2018/0321416 A1 | 11/2018 | Freedman | |
| 2018/0355707 A1 | 12/2018 | Herrera et al. | |
| 2019/0010795 A1 | 1/2019 | Cascio et al. | |
| 2019/0017203 A1 | 1/2019 | Andoh et al. | |
| 2019/0078424 A1 | 3/2019 | Copeland et al. | |
| 2019/0211658 A1 | 7/2019 | Hull et al. | |
| 2019/0292436 A1 | 9/2019 | Mason et al. | |
| 2019/0345377 A1 | 11/2019 | Haque et al. | |
| 2020/0048531 A1 | 2/2020 | Hull et al. | |

FOREIGN PATENT DOCUMENTS

| | | |
|---|---|---|
| CN | 101819111 | 12/2011 |
| CN | 1621803 | 5/2012 |
| CN | 103387827 | 11/2013 |
| CN | 102183410 | 5/2014 |
| CN | 104727799 | 6/2015 |
| CN | 105445440 | 3/2016 |
| CN | 105567213 | 5/2016 |
| EP | 0247669 | 12/1987 |
| EP | 0460927 | 11/1991 |
| EP | 2480625 | 4/2013 |
| EP | 2480626 | 4/2013 |
| GB | 2161269 | 8/1988 |
| WO | WO 1997028098 | 8/1997 |
| WO | WO 2000060379 | 10/2000 |
| WO | WO 2001094749 | 12/2001 |
| WO | WO 2002064702 | 8/2002 |
| WO | WO 2004005435 | 1/2004 |
| WO | WO 2008001218 | 1/2008 |
| WO | WO 2010138914 | 12/2010 |
| WO | WO 2011035292 | 3/2011 |
| WO | WO 2011035294 | 3/2011 |
| WO | WO 2012051647 | 4/2012 |
| WO | WO 2012057910 | 5/2012 |

(56) References Cited

FOREIGN PATENT DOCUMENTS

| | | |
|---|---|---|
| WO | WO 2012087887 | 6/2012 |
| WO | WO 2012087898 | 6/2012 |
| WO | WO 2012104582 | 8/2012 |
| WO | WO 2012122505 | 9/2012 |
| WO | WO 2012171857 | 12/2012 |
| WO | WO 2013052359 | 4/2013 |
| WO | WO 2013112114 | 8/2013 |
| WO | WO 2013149122 | 10/2013 |
| WO | WO 2013154926 | 10/2013 |
| WO | WO 2013155061 | 10/2013 |
| WO | WO 2014008496 | 1/2014 |
| WO | WO 2014008598 | 1/2014 |
| WO | WO 2014123672 | 8/2014 |
| WO | WO 2014178504 | 11/2014 |
| WO | WO 2015041664 | 3/2015 |
| WO | WO 2015041669 | 3/2015 |
| WO | WO 2015071750 | 5/2015 |
| WO | WO 2015097116 | 7/2015 |
| WO | WO 2015126082 | 8/2015 |
| WO | WO 2015163858 | 10/2015 |
| WO | WO 2015181028 | 12/2015 |
| WO | WO 2015200060 | 12/2015 |
| WO | WO 2016089813 | 6/2016 |
| WO | WO 2016094153 | 6/2016 |
| WO | WO 2017035371 | 3/2017 |
| WO | WO 2017040824 | 3/2017 |
| WO | WO 2017040834 | 3/2017 |
| WO | WO 2017065331 | 4/2017 |
| WO | WO 2017086975 | 5/2017 |
| WO | WO 2017136641 | 8/2017 |
| WO | WO 2017161157 | 9/2017 |
| WO | WO 2018025010 | 2/2018 |
| WO | WO 2018045290 | 3/2018 |
| WO | WO 2018118024 | 6/2018 |
| WO | WO 2018170065 | 9/2018 |

OTHER PUBLICATIONS

"Hydraulic Fracturing Fluid Product Component Information Disclosure," 2012, 2 pages.

Abad et al., "Evaluation of the Material Properties of the Multilayered Oxides formed on HCM12A using New and Novel Techniques," Manuscript Draft, Manuscript No. OXID-D-15-00019, 2015, 44 pages.

Abass et al., "Wellbore Instability of Shale Formation, Zuluf Field, Saudi Arabia," Society of Petroleum Engineers (SPE), presented at the SPE Technical Symposium on Saudi Arabia Section, Dhahran, Saudi Arabia, May 21-23, 2006, 10 pages.

Abousleiman and Nguyen, "Poromechanics Response of Inclined Wellbore Geometry in Fractured Porous Media," Journal of Engineering Mechanics, ASCE, Nov. 2005, 131:11, 14 pages.

Abousleiman et al, "A Micromechanically Consistent Poroviscoelasticity Theory for Rock Mechanics Applications," Int. J. Rock Mech. Min. Sci. & Geomech. Abstr., 1993, 30:7 (1177-1180), 4 pages.

Abousleiman et al, "Anisotropic Porothermoelastic Solution and Hydro-Thermal Effects on Fracture Width in Hydraulic Fracturing," International Journal for Numerical and Analytical Methods in Geomechanics, 2013, 25 pages.

Abousleiman et al, "Geomechanics Field and Laboratory Characterization of Woodford Shale: The Next Gas Play," SPE 110120, Society of Petroleum Engineers (SPE), presented at the 2007 SPE Annual Technical Conference and Exhibition on Nov. 11-14, 2007, 14 pages.

Abousleiman et al, "Poroviscoelastic Analysis of Borehole and Cylinder Problems," ACTA Mechanica, 1996, 119: 199-219, 21 pages.

Abousleiman et al, "The Granular and Polymer Nature of Kerogen Rich Shale," Acta Geotechnica 2016, 11:3 (573-594), 24 pages.

Abousleiman et al., "GeoGenome Industry Consortium(G2IC)," JIP, 2004-2006, 6 pages.

Abousleiman et al., "GeoMechanics Field Characterization of the Two Prolific U.S. Mid-West Gas Plays with Advanced Wire-Line Logging Tools," SPE 124428, Society of Petroleum Engineers (SPE), presented at the 2009 SPE Annual Technical Conference and Exhibition, Oct. 4-7, 2009, 19 pages.

Abousleiman et al., "Geomechanics Field Characterization of Woodford Shale and Barnett Shale with Advanced Logging Tools and Nano-indentation on Drill Cuttings," The Leading Edge, Special Section: Borehole Geophysics, Jun. 2010, 6 pages.

Abousleiman et al., "Mandel's Problem Revisited," Geotechnique, 1996, 46:2 (187-195), 9 pages.

Abousleiman et al., "Mechanical Characterization of Small Shale Samples subjected to Fluid Exposure using the Inclined Direct Shear Testing Device," International Journal of Rock Mechanics and Mining Sciences, 2010, 47:3 (355-367), 13 pages.

Abousleiman et al., "Modeling Real-Time Wellbore Stability within the Theory of Poromechanics," AADE-03-NTCE-11, American Association of Drilling Engineers (AADE), presented at the AADE 2003 National Technology Conference, Practical Solutions for Drilling Challenges, Texas, Apr. 1-3, 2003, 14 pages.

Abousleiman et al., "Poroelastic Solutions in Transversely Isotropic Media for Wellbore and Cylinder," Int. J. Solids Structures, 1998, 35:34-35 (4905-4929), 25 pages.

Abousleiman et al., "Time-Dependent wellbore (in)stability predictions: theory and case study," IADC/SPE 62796, International Association of Drilling Contactors (IADC), Society of Petroleum Engineers (SPE), presented at the 2000 IADC/SPE Asia Pacific Drilling Technology held in Kuala Lumur, Malaysia, Sep. 11-13, 2000, 8 pages.

Agenet et al., "Fluorescent Nanobeads: a First Step Toward Intelligent Water Tracers," SPE 157019, Society of Petroleum Engineers (SPE), SPE International Oilfield Nanotechnology Conference, Jun. 12-14, 2012, 13 pages.

Agilent Technologies, "Field-Deployable Solution for Nanoporosity Measurements in Mud Logging Operations and a Novel Method for Fracability Analysis Using Mud Cuttings," Gulf Coast Conference, Agilent Restricted, Oct. 2013, 44 pages.

Ahmed et al. "7.2.2 Information Required to Move to a Pilot Project," Unconventional Resources Exploitation and Development, 2016, 1 page.

Allan et al., "A Multiscale Methodology for the Analysis of Velocity Anisotropy in Organic-Rich Shale," Geophysics, Jul.-Aug. 2015, 80:4 (C73-C88), 16 pages.

Al-Munthasheri, "A Critical Review of Hydraulic Fracturing Fluids over the Last Decade," SPE 169552, Society of Petroleum Engineers (SPE), presented at the SPE Western North American and Rocky Mountain Joint Regional Meeting, Apr. 16-18, 2014, 25 pages.

Altowairqi, "Shale elastic property relationships as a function of total organic carbon content using synthetic samples," Journal of Petroleum Science and Engineering, Sep. 2015, 133: 392-400, 9 pages.

Ananthan et al., "Influence of Strain Softening on the Fracture of Plain Concrete Beams," International Journal of Fracture, 1990, 45: 195-219, 25 pages.

Anisimov, "The Use of Tracers for Reservoir Characterization," SPE 118862, Society of Petroleum Engineers (SPE), presented at SPE Middle East Oil and Gas Show and Conference, Mar. 15-18, 2009, 8 pages.

Arns et al., "Computation of linear elastic properties from microtomographic images: Methodology and agreement between theory and experiment," Geophysics, Sep. 1, 2002, 67:5 (1396-1405), 10 pages.

Aslan et al., "Fluorescent Core—Shell AG@SiO$_2$ Nanocomposites for Metal-Enhanced Fluorescence and Single Nanoparticle Sensing Platforms," American Checmial Society (ACS), J. Am. Chem. Soc., JACS Communications, Jan. 19, 2007, 129: 1524-1525, 2 pages.

Atarita et al., "Predicting Distribution of Total Organic Carbon (TOC) and S2 with Δ Log Resistivity and Acoustic Impedance Inversion on Talang Akar Formation, Cipunegara Sub Basin, West Java," Procedia Engineering, 2017, 170: 390-397, 8 pages.

(56) References Cited

OTHER PUBLICATIONS

Ballice, "Solvent Swelling Studies of Goynuk (Kerogen Type-I) and Beypazari Oil Shales (Kerogen Type-II)," Science Direct, 2003, Fuel 82: 1317-1321, 5 pages.

Barati and Liang, "A Review of Fracturing Fluid Systems Used for Hydraulic Fracturing of Oil and Gas Wells," Journal of Applied Polymer Science, Aug. 15, 2014, 131:16, 11 pages.

Barenblatt et al., "Basic Concepts in the Theory of Seepage of Homogeneous Liquids in Fissured Rocks (Strata)," PMM 1960, 24:5 (852-864), 18 pages.

Bazant et al., "Deformation of Progressively Cracking Reinforced Concrete Beams," ACI Materials Journal, Technical Paper, Title No. 81-26, May-Jun. 1984, 81:3, 11 pages.

Bazant et al., "Size Effect in Brazilian Split-Cylinder Tests: Measurements and Fracture Analysis," ACI Materials Journal, Technical Paper, Title No. 88-M40, May 31, 1991, 88:3 (325-332), 8 pages.

Bazant et al., "Strain-Softening Bar and Beam: Exact Non-Local Solution," Int. J. Solids Structures, 1988, 24:7 (659-673), 15 pages.

Bennett et al., "Instrumented Nanoindentation and 3D Mechanistic Modeling of a Shale at Multiple Scales," Acta Geotechnica, 10:21, Jan. 9, 2015, 14 pages.

Berryman, "Extension of Poroelastic Analysis to Double-Porosity Materials: New Technique in Microgeomechanics," Journal of Engineering Mechanics, 128:8 (840), Aug. 2002, 8 pages.

Bhandari et al., "Two-Dimensional DEM Analysis of Behavior of Geogrid-Reinforced Uniform Granular Bases under a Vertical Cyclic Load," Acta Geotechnica, Research Paper, 2015, 10: 469-480, 12 pages.

Biot et al., "Temperature analysis in hydraulic fracturing," Journal of Petroleum Technology, 39:11, Nov. 1987, 9 pages.

Biot, "General Theory of Three-Dimensional Consolidation," the Ernest Kempton Adams Fund for Physical Research of Columbia University, Reprint Series, Journal of Applied Physics, 12:2 (155-164), Feb. 1941, 11 pages.

Bisnovat et al., "Mechanical and petrophysical behavior of organic-rich chalk from the Judea Plains, Israel," Marine and Petroleum Geology, 64: 152-164, Jun. 2015, 13 pages.

Blanz et al., "Nuclear Magnetic Resonance Logging While Drilling (NMR-LWD): From an Experiment to a Day-to-Day Service for the Oil Industry," Diffusion Fundamentals, 2010, 14(2), 5 pages.

Bobko et al., "The Nanogranular Origin of Friction and Cohesion in Shale—A Strength Homogenization Approach to Interpretation of Nanoindentation Results," International Journal for Numerical and Analytical Methods in Geomechanics, 2010, 23 pages.

Boskey et al., "Perspective—Collagen and Bone Strength," Journal of Bone and Mineral Research, 14:3, Nov. 3, 1999, 6 pages.

Bourbie and Zinszner, "Hydraulic and Acoustic Properties as a Function of Porosity in Fontainebleau Sandstone," Journal of Geophysical Research, 90(B13):11,524-11,532, Nov. 1985, 9 pages.

Bratton et al., "The Nature of Naturally Fractured Reservoirs," Oilfield Review, Jun. 2006, 21 pages.

Brochard et al., "Fracture Properties of Kerogen and Importance for Organic-Rich Shales," Annual World Conference on Carbon (Carbon 2013), Jul. 2013, 5 pages.

Bunzil et al., "Taking Advantage of Luminescent Lanthanide Ions," Chemical Society Reviews (CSR), Critical Review, 34: 1048-1077, Dec. 2005, 30 pages.

Caenn et al., "Chapter 9: Wellbore Stability," p. 359, in Composition and Properties of Drilling and Completion Fluids, 7th Edition: Gulf Professional Publishing, 2016, 1 page.

Cahill et al., "Nanoscale Thermal Transport II," Applied Physics Reviews 1.1:011305, 2014, 46 pages.

Cahill et al., "Nanoscale Thermal Transport," Journal of Applied Physics 93:2, Jan. 15, 2003, 28 pages.

California Council on Science and Technology Lawrence Berkeley National Laboratory Pacific Institute, "Advanced Well Stimulation Technologies in California: An Independent Review of Scientific and Technical Information," CCST, Jul. 2016, 400 pages.

Carcione and Avseth, "Rock-physics templates for clay-rich source rocks," Geophysics 80:5 (D481-D500), Sep. 2015, 21 pages.

Carter and Hanson, "Fake Moon Dirt, HOOD Solar System Science," UT Dallas Magazine, 6:2, Spring 2016, 1 page.

Chang et al., "Magnetic SERS Composite Nanoparticles for Microfluidic Detection," abstract to 251st ACE National Meeting, Mar. 13-17, 2016, 1 page (abstract).

Chang, "In-Situ Formation of Proppant and Highly Permeable Blocks for Hydraulic Fracturing," SPE-173328-MS, Society of Petroleum Engineers (SPE), SPE Hydraulic Fracturing Technology Conference Feb. 3-5, 2015, 11 pages.

Chen et al., "Size Effect in Micro-Scale Cantilever Beam Bending," Acta Mech., 219: 291-307, 2011, 17 pages.

Chen et al., "FITC functionalized magnetic core-shell $Fe_3O_4/Ag$ hybrid nanoparticle for selective determination of molecular biothiols," Sensors and Actuators B: Chemical, 193: 857-863, Dec. 2013, 7 pages.

Chern et al., "Deformation of Progressively Cracking Partially Prestressed Concrete Beams," PCI Journal, 37:1 (74-84), 1992, 11 pages.

Cheshomi et al., "Determination of uniaxial compressive strength of microcystalline limestone using single particles load test," Journal of Petroleum Science and Engineering, 111: 121-126, 2013, 6 pages.

Chuang et al., "Ultra-sensitive in-situ detection of novel near-infrared persistent luminescent tracer nanoagents in crude oil-water mixtures," a natureresearch journal, Scientific Reports, Jun. 15, 2016, 5 pages.

Chupin et al., "Finite Strain Analysis of Nonuniform Deformation Inside Shear Bands in Sands," International Journal for Numerical and Analytical Methods in Geomechanics, 36: 1651-1666, 2012, 16 pages.

Clough et al., "Characterization of Kerogen and Source Rock Maturation Using Solid-State NMR Spectroscopy," Energy & Fuels, 2015, 29(10): 6370-6382, 42 pages.

Corapcioglu, "Fracturing Fluid Effects on Young's Modulus and Embedment in the Niobrara Formation," Thesis for degree of Master of Science (Petroleum Engineering), Colorado School of Mines, 2014, 189 pages.

Cubillos et al., "The Value of Inter-well and Single Well Tracer Technology for De-Risking and Optimizing a CEOR Process—Caracara Field Case," SPE 174394-MS, Society of Petroleum Engineers (SPE), presented at EUROPEC 2015, Jun. 1-4, 2015, 19 pages.

Cui et al., "Poroelastic solution for an inclined borehole," Transactions of the ASME, Journal of Applied Mechanics, 64, Mar. 1997, 7 pages.

Custelcean et al., "Aqueous Sulfate Separation by Crystallization of Sulfate-Water Clusters," Angewandte Chemie, International Edition, 2015, 54: 10525-10529, 5 pages.

Dagan, "Models of Groundwater Flow in Statistically Homogeneous Porous Formations," Water Resource Search 15:1, Feb. 1979, 17 pages.

Daneshy, "Hydraulic Fracturing to Improve Production," Tech 101, TheWayAhead, 6:3, Oct. 2010, 4 pages.

Das et al., "Molecular Fluorescence, Phosphorescence, and Chemiluminescence Spectrometry," American Chemical Society Publications (ACS), Analytical Chemistry, 84: 597-625, Nov. 3, 2011, 29 pages.

De Block et al., "A New Solution for the Characterization of Unconventional Shale Resources Based on Analysis or Drill Cutting," SPE-177601-MS, Society of Petroleum Engineers (SPE), presented at the Abu Dhabi International Petroleum Exhibition and Conference, Nov. 9-12, 2015, 6 pages.

De Rocha et al., "Concentrated CO2-in-Water Emulsions with Nonionic Polymeric Surfactants," Journal of Colloid and Interface Science, 2001, 239:1 (241-253), 13 pages.

Deans, "Using Chemical Tracers to Measure Fractional Flow and Saturation In-Situ," SPE 7076, Society of Petroleum Engineers (SPE) of AIME, presented at Fifth Symposium on Improved Methods for Oil Recovery of the Society of Petroleum Engineers of AIME, Apr. 16-19, 1978, 10 pages.

Deirieh et al., "Nanochemomechanical Assessment of Shale: A Coupled WDS-Indentation Analysis," Acta Geotechnica, Research Paper, Sep. 2012, 25 pages.

(56) References Cited

OTHER PUBLICATIONS

Delafargue and Ulm, "Explicit approximations of the indentation modulus of elastically orthotropic solids for conical indenters," International Jomnal of Solids and Structures 41:26 (7351-7360), Dec. 2004, 10 pages.

Detournay and Cheng, "Poroelastic Response of a Borehole in a Non-Hydrostatic Stress Field," International Journal of Rock Mechanics, Min. Science and Geomech. Abstracts, 25:3, 1988, 12 pages.

Devarapalli et al., "Micro-CT and FIB-SEM imaging and pour structure characterization of dolomite rock at multiple scales," Arabian Journal of Geosciences 10:361, Aug. 2017, 9 pages.

Du et al., "Interwell Tracer Tests: Lessons Learned from past Field Studies," SPE 93140, Society of Petroleum Engineers (SPE), presented at SPE Asia Pacific Oil and Gas Conference and Exhibition, Apr. 5-7, 2005, 9 pages.

Ducros, "Source Rocks of the Middle East," Source Rock Kinetics: Goal and Perspectives. AAPG Geosciences Technology Workshop, Jul. 2016, 30 pages.

Eastoe et al., "Water-in-CO2 Microemulsions Studied by Small-Angle Neutron Scattering," Langmuir 1997, 13:26 (6980-6984), 5 pages.

Ehlig-Economides and Economides, "Water as Poppant," SPE-147603, Society of Petroleum Engineers (SPE), presented at the SPE Annual Technical Conference and Exhibition, Oct. 30-Nov. 2, 2011, 8 pages.

Ekbote et al., "Porochemoelastic Solution for an Inclined Borehole in a Transversely Isotropic Formation," Journal of Engineering Mechanics, ASCE, Jul. 2006, 10 pages.

El-Aneed et al., "Mass Spectrometry, Review of the Basics: Electrospray, MALDI, and Commonly Used Mass Analyzers," Applied Spectroscopy Reviews 44:3 (210-230), Mar. 16, 2009, 22 pages.

Elijah, "Numerical Modeling of Wellbore Instability (Tensile Failure) Using Fracture Mechanics Approach," Thesis for the degree of Master of Science, African University of Science and Technology Abuja, May 2013, 77 pages.

Eliyahu et al., "Mechanical Properties of organic matter in shales mapped at the nanometer scale," Marine and Petroleum Geology, 59:294-304, Sep. 18, 2014, 11 pages.

Ertas et al., "Petroleum Expulsion Part 1. Theory of Kerogen Swelling in Multicomponent Solvents," Energy & Fuels, 20: 295-300, 2006, 6 pages.

Eseme et al., "Review of mechanical properties of oil shales: implications for exploitation and basin modeling," Oil Shale 24:2 (159-174), Jan. 2007, 16 pages.

Esfahani et al., "Quantitative nanoscale mapping of three-phase thermal conductivities in filled skutterudites via scanning thermal microscopy," Nature Science Review 5:1, Feb. 2017, 31 pages.

Ewy, "Shale Swelling/Shrinkage and Water Content Change due to Imposed Suction and Due to Direct Brine Contact," Acta Geotechnica, 9: 869-886, 2014, 18 pages.

Ewy, "Wellbore-Stability Predictions by Use of a Modified Lade Criterion," SPE Drill and Completion, 14:2, Jun. 1999, 7 pages.

Fekete.com [online], "Dual Porosity," retrieved from URL <www.fekete.com/SAN/WebHelp/FeketeHarmony/Harmony_WebHelp/Content/HTML_Files/Reference_Material/General_Concepts/Dual_Porosity.htm>, available on or before 2014, retrieved on Nov. 11, 2019, 6 pages.

Finney, "Random packings and the structure of simple liquids I. The geometry of random close packing," Proc. Roy. Soc. Lond. 319, 479-493, May 1970, 15 pages.

Fjaer et al., "Stresses around Boreholes. Borehole Failure Criteria," in Petroleum Related Rock Mechanics, 2nd Edition, 2008, 156, 1 page.

Frazer et al., "Localized Mechanical Property Assessment of SiC/SiC Composite Materials," Science Direct, Composites: Part A, 70: 93-101, 2015, 9 pages.

Gallegos and Varela, "Trends in Hydraulic Fracturing Distributions and Treatment Fluids, Additives, Proppants, Water Volumes Applied to Wells Drilled in the United States from 1947 through 2010—Data Analysis and Comparison to the Literature," USGS, United States Geological Survey, 2015, 24 pages.

Gandossi and Estorff, "An overview of hydraulic fracturing and other formation stimulation technologies for shale gas production," JRC Science for Policy Report, European Commission, EUR 26347 EN, Jan. 2013, 62 pages.

Ganjdanesh et al. "Treatment of Condensate and Water Blocks in Hydraulic-Fractured Shale-Gas/Condensate Reservoirs," SPE-175145, Society of Petroleum Engineers (SPE), presented at the SPE Annual Technical Conference and Exhibition, Sep. 28-30, 2015, SPE Journal, Apr. 2016, 10 pages.

Gao et al., "Materials Become Insensitive to Flaws at Nanoscale: Lessons from Nature," PNAS, 100:10, May 13, 2003, 4 pages.

Gardiner et al., "Chapter 1: Introduction to Raman Scattering," in Practical Raman Spectroscopy, Springer-Verlag, 1989, 9 pages.

Garnero, "The Contribution of Collagen Crosslinks to Bone Strength," Int. Bone & Mineral Society, BoneKEy Reports 1:182, Sep. 2012, 8 pages.

George et al., "Approximate relationship between frequency-dependent skin depth resolved from geoelectronnagnetic pedotransfer function and depth of investigation resolved from geoelectrical measurements: A case study of coastal formation, southern Nigeria," Journal of Earth Syst. Sci, 125:7 (1379-1390), Oct. 2016, 12 pages.

Georgi et al., "Physics and Chemistry in Nanoscale Rocks," Society of Petroleum Engineers (SPE), SPE Forum Series, Frontiers of Technology, Mar. 22-26, 2015, 4 pages.

Glossary.oilfield.slb.com [online], "Oilfield Glossary: fluid-friction reducer," available on or before Jun. 15, 2017, retrieved from URL< http://www.glossary.oilfield.slb.com/Terms/f/fluid-friction_reducer.aspx>, 1 page.

Glover et al., "The Use of Measurements Made on Drill Cuttings to Construct and Apply Geomechanical Well Profiles," ARMA 16-0737, American Rock Mechanics Association (ARMA), presentation at the 50th US Rock Mechanics/Geomechanics Symposium, Jun. 26-29, 2016, 11 pages.

Golomb et al., "Macroemulsion of liquid and supercritical CO2-in-water and water-in-liquid CO2 stabilized with fine particles," American Chemical Society (ACS), Ind. Eng. Chem. Res. 2006, 45:8 (2728-2733), 6 pages.

Goodman, "Chapter 3: Rock Strength and Failure Criteria," in Introduction to Rock Mechanics, John Wiley & Sons, 1989, 21 pages.

Gu and Mohanty, "Effect of Foam Quality on Effectiveness of Hydraulic Fracturing in Shales," International Journal of Roch Mechanics and Mining Sciences, 70: 273-285, 2014, 13 pages.

Han and Cundall, "LBM-DEM modeling of fluid-solid interaction in porous media," International Journal for Numerical and Analytical Methods in Geomechanics, 37:10 (1391-1407), Jul. 2013, 17 pages.

Han et al., "Numerical and Experimental Studies of Kerogen Rich Shales on Millimeter-Scale Single-Edge Notched Beam," ARMA-19-211, American Rock Mechanics Association (ARMA), prepared for presentation at the 53rd US Rock Mechanics and Geomechanics Symposium in New York, Jun. 23-26, 2019, 8 pages.

Han et al., "Numerical Modeling of Elastic Spherical Contact for Mohr-Coulomb Type Failures in Micro-Geomaterials," Experimental Mechanics, 57: 1091-1105, Jun. 16, 2017, 15 pages.

Han et al., "Application of Silver-Coated Magnetic Microspheres to a SERS-Based Optofluidic Sensor," American Chemical Society Publications (ACS), the Journal of Physical Chemistry C (JPCC), 115: 6290-6296, Mar. 7, 2011, 7 pages.

Harrison et al, "Water-in-Carbon Dioxide Microemulsions with a Fluorocarbon-Hydrocarbon Hybrid Surfactant," Langmuir 1994, 10:10 (3536-3541), 6 pages.

Hiramatsu and Oka, "Stress around a shaft or level excavated in ground with a three-dimensional stress state," Mem. Fra. Eng. Kyotu Univ. 24, 1962, 2 pages (Abstract).

Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, 112:044907, Aug. 30, 2012, 16 pages.

(56) References Cited

OTHER PUBLICATIONS

Hoek and Brown, "Empirical Strength Criterion for Rock Masses," Journal of the Geotechnical Engineering Division, Sep. 1980, 20 pages.

Hornby et al., "Anisotropic Effective-Medium Modeling of the Elastic Properties of Shales," Geophysics, 59:10 (1570-1583), Oct. 1994, 14 pages.

Hosemann et al., "Mechanical Characteristics of SiC Coating Layer in TRISO Fuel Particles," Journal of Nuclear Materials, 442: 133-142, 2013, 10 pages.

Hosemann et al., "An Exploratory Study to Determine Applicability of Nano-Hardness and Micro-compression Measurements for Yield Stress Estimation," Science Direct, Journal of Nuclear Materials, 375: 135-143, 2008, 9 pages.

Hu et al., "Smart Liquid SERS Substrates based on $Fe_3O_4$/Au Nanoparticles with Reversibility Tunable Enhancement Factor for Practical Quantitative Detection," a natureresearch journal, Scientific Reports, 4:7204, Nov. 27, 2014, 10 pages.

Hull and Abousleiman, "Chapter 10: Insights of the Rev of Source Shale from Nano- and Micromechanics," in New Frontiers in Oil and Gas Exploration, Springer International Publishing Switzerland, 2016, 29 pages.

Hull et al, "Nanomechanical Characterization of the Tensile Modulus of Rupture of Kerogen-Rich Shale," SPE 177628, Society of Petroleum Engineers (SPE), presented at the Abu Dhabi International Petroleum Exhibition and Conference, Nov. 9-12, 2015, SPE Journal 2017, 22:4 (1024-1033), 10 pages.

Hull et al., "Oxidative Kerogen Degradation: A Potential Approach to Hydraulic Fracturing in Unconventionals," Energy Fuels 2019, 33:6 (4758-4766), 9 pages.

Hull et al., "Recent Advances in Viscoelastic Surfactants for improved Production from Hydrocarbon Reservoirs," SPE 173776, Society of Petroleum Engineers (SPE), presented at the SPE International Symposium on Oilfield Chemistry, Apr. 13-15, 2015, SPE Journal, 2016, 18 pages.

Huseby et al., "High Quality Flow Information from Tracer Data," SPE-169183-MS, Society of Petroleum Engineers (SPE), presented at the SPE Bergen One Day Seminar, Apr. 2, 2014, 9 pages.

Hutchins et al., "Aqueous Tracers for Oilfield Applications," SPE-21049, Society of Petroleum Engineers (SPE), presented at SPE International Symposium on Oilfield Chemistiy, Feb. 20-22, 1991, 9 pages.

Iqbal et al., "In situ micro-cantilver tests to study fracture properties of NiAl single crystals," Acta Materialia, 60:3 (1193-1200), Feb. 2012, 8 pages.

Itascacg.com' [online], "Particle Flow Code, Version 5.0," Itasca Consulting Group, Inc., available on or before Apr. 11, 2014, [retrieved on May 11, 2018], rettieved from URL: <https://www.itascacg.com/software/pfc>, 5 pages.

Itascacg.com [online], "Three-dimensional Fast Lagrangian Analysis of Continua (FLAC3D)," available on or before 2012, [retrieved on Jun. 7, 2018], retrieved from URL: <https://www.itascacg.com/software/flac3d>, 4 pages.

Iyengar et al., "Analysis of Crack Propagation in Strain-Softening Beams," Engineering Fracture Mechanics 69: 761-778, 2002, 18 pages.

Jaeger et al., "Fundamentals of Rock Mechanics," 4th Edition, Wiley, 2007, 486 pages.

Jia et al., "Highly Efficient Extraction of Sulfate Ions with a Tripodal Hexaurea Receptor," Angew. Chem. Int. Ed., 2011, 50: 486-490, 5 pages.

Jianhong et al., "Estimation of the Tensile Elastic Modulus using Brazilian disc by Applying Diametrically Opposed Concentrated Loads," International Journal of Rock Mechanics & Mining Sciences 46:3 (568-576), 2009, 9 pages.

Johnston et al, "Water-in-Carbon Dioxide Microemulsions: An Environment for Hydrophiles Including Proteins," Science, 271:5249 (624-626), Feb. 2, 1996, 3 pages.

Jose et al., "Continuous multi cycle nanoindentation studies on compositionally graded $Ti_{1-x}Al_xN$ multilayer thin films," Materials Science and Engineering A, 528:21 (6438-6444), Apr. 20, 2011, 7 pages.

Jun et al., "Multifunctional Silver-Embedded Magnetic Nanoparticles as SERS Nanoprobes and Their Applications," Nano Micro Small, Multifunctional Nanoparticles, 6:1 (119-125), Jan. 4, 2010, 7 pages.

Kang et al., "An experimental study on oxidizer treatment used to improve the seepage capacity of coal reservoirs," Natural Gas Industry B, 6: 129-137, Sep. 25, 2018, 9 pages.

Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels 20: 310-308, 2006, 8 pages.

Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.

Kim et al., "Numerical analysis of fracture propagation during hydraulic fracturing operations in shale gas systems," International Journal of Rock and Mechanics Mining Sciences, 76: 127-137, 2015, 11 pages.

King, "Thirty Years of Gas Shale Fracturing: What Have We Learned?" SPE-133456, Society of Petroleum Engineers (SPE), presented at the SPE Annual Technical Conference and Exhibition, Sep. 19-22, 2010, 50 pages.

Klapetek, "Chapter 11: Thermal Measurements," in Quantitative Data Processing in Scanning Probe Microscopy: SPM Applications for Nanometrology, 2018, 26 pages.

Kneipp et al., "Single Molecule Detection Using Surface-Enhanced Raman Scattering (SERS)," Physical Review Letters, American Physical Society 78:9, Mar. 3, 1997, 4 pages.

Kolymbas, "Kinematics of Shear Bands," Acta Geotechnica, 4:315-318, 2009, 4 pages.

Kumar et al., "Nano to Macro Mechanical Characterization of Shale," SPE 159804, Society of Petroleum Engineers (SPE), presented at the SPE Annual Technical Conference and Exhibition, Oct. 8-10, 2012, 23 pages.

Kuperkar et al., "Visoelastic micellar water/CTAB/NaNO3 Solutions: Reology, SANS and cyro-TEM Analysis," Journal of Colloid and Interface Science, 323: 403-409, 2008, 7 pages.

Lam et al., "Experiments and Theory in Strain Gradient Elasticity," Journal of Mechanics and Physics of Solids, 51: 1477-1508, 2003, 32 pages.

Larsen et al., "Changes in the Cross-Link Density of Paris Basin Toarcian Kerogen Dining Maturation," Organic Geochemistry 33: 1143-1152, 2002, 10 pages.

Lee et al., "Water-in carbon dioxide emulsions: Formation and stability," Langmuir, 1999, 15:20 (6781-6791), 11 pages.

Lewan, "Evaluation of petroleum generation by hydrous pyrolysis experimentation," Phil. Trans. R. Soc. Lond. A, 1985, 315: 123-134, 13 pages.

Lewan, "Experiments on the role of water in petroleum formation," Geochimica et Cosmochimica Acta, Pergamon, 1997, 61:17 (3691-3723), 33 pages.

Li et al., "A review of crosslinked fracturing fluids prepared with produced water," KeAi Advanced Research Evolving Science, Southwest Petroleum University, Petroleum 2, 2:4 (313-323), Dec. 2016, 11 pages.

Li et al., "Differentiating Open Natural Fractures from Healed Fractures Using the New, High-Definition Oil-Based Mud Microelectrical Imager-Case Studies from Organic Rich Shales," SPE-174923-MS, Society of Petroleum Engineers (SPE), presented at the SPE Annual Technical Conference and Exhibition, Sep. 28-30, 2015, 16 pages.

Li et al., "High-Temperature Fracturing Fluids Using Produced Water with Extremely High TDS and Hardness," IPTC-17797-MS, International Petroleum Technology Conference (IPTC), presented at the International Petroleum Technology Conference, Dec. 10-12, 2014, 13 pages.

(56) References Cited

OTHER PUBLICATIONS

Li et al., "Mechanical Characterization of Micro/Nanoscale Structures for MEMS/NEMS Applications using Nanoindentation Techniques," Science Direct, Ultramicroscopy, 97: 481-494, 2003, 14 pages.

Li et al., "The Brazilian Disc Test for Rock Mechanics Applications: Review and New Insights," Rock Mech Rock Eng, 2013, 46: 269-287, 19 pages.

Li et al., "Well Treatment Fluids Prepared With Oilfield Produced Water: Part II," SPE-133379-MS, Society of Petroleum Engineers (SPE), presented at the SPE Annual Technical Conference and Exhibition, Sep. 19-22, 2010, 7 pages.

Liang et al., "An Experimental Study on interactions between Imbibed Fractured Fluid and Organic-Rich Tight Carbonate Source Rocks," SPE-188338-MS, Society of Petroleum Engineers (SPE), presented at the Abu Dhabi International Petroleum Exhibition and Conference, Nov. 13-16, 2017, 14 pages.

Liu and Abousleiman, "Multiporosity/Multipermeability Inclined-Wellbore Solutions with Mudcake Effects," Society of Petroleum Engineers (SPE), SPE Journal 23:5, Oct. 2018, 25 pages.

Liu and Abousleiman, "N-Porosity and N-Permeability generalized wellbore stability analytical solutions and applications," ARMA 16-417, America Rock Mechanics Association (ARMA), presented at the 50th US Rock Mechanics/Geomechanics Symposium held in Houston, Texas, Jun. 26-29, 2016, 10 pages.

Liu et al., "Applications of nano-indentation methods to estimate nanoscale mechanical properties of shale reservoir rocks," Journal of Natural Gas Science and Engineering, 35: 1310-1319, Sep. 29, 2016, 10 pages.

Liu et al., "Microstructural and geomechanical analysis of Bakken shale at nanoscale," Journal of Petroleum Science and Engineering, 153: 138-144, Mar. 23, 2017, 12 pages.

Liu et al., "Poroelastic Dual-Porosity/Dual-Permeability After-Closure Pressure-Curves Analysis in Hydraulic Fracturing," SPE 181748, Society of Petroleum Engineers (SPE), SPE Journal 2016, 21 pages.

Liu et al., "Safe Drilling in Chemically Active and Naturally Fractured Source Rocks: Analytical Solution and Case Study," IADC/SPE-189658-MS, Society of Petroleum Engineers (SPE), IADC, presented at the IADC/SPE Drilling Conference and Exhibition, Mar. 6-8, 2018, 13 pages.

Liu, "Dimension effect on mechanical behavior of silicon micro—cantilver beams," Measurement, 41:8 (885-895), Oct. 2008, 11 pages.

Liu, "Elastic Constants Determination and Deformation Observation Using Brazilian Disk Geometry," Experimental Mechanics, 2010, 50:1025-1039, 15 pages.

Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.

Liu, "Micro-cantilver Testing to Evaluate the Mechanical Properties of Thermal Barrier Coatings," presented at the 19th European Conference on Fracture (ECF19): Fractuie Mechanics for Durability, Reliability and Safety, Conference Proceedings, Aug. 26-31, 2012, 7 pages.

Long et al., "Chapter 2: Advanced Well Stimulation Technologies," in an Independent Scientific Assessment of Well Stimulation in California, vol. I, Well Stimulation Technologies and their Past, Present and Potential Future Use in California, Jan. 2015, 62 pages.

Low, "Advances in Ceramics Matrix Composites," Processing. Properties and applications of SiCl/SiC, 10-19, Nanoceramic Matric Composites, 30-41, 2014, 11 pages.

Low, "Ceramic-Matrix Composites: Microstructure, Properties and Applications," Woodhead Publishing Limited, 11-19, 30-40, 2006, 11 pages.

Lu et al, "Fabrication and characterization of ceramic coatings with alumina-silica sol-incorporated a-alumina powder coated on woven quartz fiber fabrics," Ceramics International 39:6 (6041-6050), Aug. 2013, 10 pages.

Lu et al., "Quantitative prediction of seismic rock physics of hybrid tight oil reservoirs of the Permian Lucaogou Formation, Junggar Basin, Northwest China," Journal of Asian Earth Sciences, 2019, 178: 216-223, 8 pages.

Luan et al., "Creation of synthetic samples for physical modelling of natural shale," European Association of Geoscientists and Engineers (EAGE), Geophysical Prospecting 64: 898-914, Jul. 2016, 17 pages.

Lyngra et al. "Heavy Oil Characterization: Lessons Learned During Placement of a Horizontal Injector at a Tar/Oil Interface," SPE-172673-MS, Society of Petroleum Engineers (SPE), presented at the SPE Middle East Oil & Gas Show and Conference, Mar. 8-11, 2015, 20 pages.

Mahabadi et al., "A novel approach for micro-scale characterization and modeling of geomaterials incorporating actual material heterogeneity," (XP002689941) Geophysical Research Letters 39:1 (L01303), Jan. 1, 2012, 6 pages.

Mahmoud et al., "Removal of Pyrite and Different Types of Iron Sulfide Scales in Oil and Gas Wells without H2S Generation," IPTC-18279-MS, International Petroleum Technology Conferences (IPTC), presented at the International Petroleum Technology Conference, Dec. 6-9, 2015, 8 pages.

Maio et al., "Measuring Fracture Toughness of Coatings using Focused-ion-beam-machined Microbeams," J. Mater. Res., 20:2, Feb. 2005, 4 pages.

Mao et al., "Chemical and nanometer-scale structure of kerogen and its change during thermal maturation investigated by advanced solid-state 13C NMR spectroscopy," Geochimica et Cosmochimica Acta, 2010, 74(7): 2110-2127, 18 pages.

Marchetti et al., "Fluorous affinity chromatography for enrichment and determination of perfluoroalkyl substances," American Chemical Society (ACS), Annual Review of Analytical Chemistry 84: 7138-7145, Jul. 19, 2012, 8 pages.

Maxwell, "Microseismic hydraulic fracture imaging: The path toward optimizing shale gas production," The Leading Edge, Special Section: Shales, Mar. 2011, 6 pages.

McMahon et al., "First 100% Reuse of Bakken Produced Water in Hybrid Treatments Using Inexpensive Polysaccharide Gelling Agents," SPE-173783-MS, Society of Petroleum Engineers (SPE), presented at the SPE International Symposium on Oilfield Chemistry, Apr. 13-15, 2015, 9 pages.

Mehrabian and Abousleiman, "Generalized Biot's Theory an Mandel's Problem of Multiple Porosity and Multiple-Permeability Poroelasticity," American Geophysical Union (AGU), Journal of Geological Research: Solid Earth, 119:4 (2745-2763), 2014, 19 pages.

Mesa, "Spherical and rounded cone nano indenters," Micro Star Technologies Inc., available on or before Jan. 23, 2018, 24 pages.

Meyer et al., "Identification of Source Rocks on Wireline Logs by Density/Resistivity and Sonic Transit Time/Resistivity Crossplots," AAPG Bulletin, 1984, 68(2): 121-129, 9 pages.

Meyers et al., "Point load testing of drill cuttings from the determination of rock strength," ARMA-05-712, presented at the 40th U.S. Symposium on Rock Mechanics (USRMS), Alaska Rocks 2005, American Rock Mechanics Association, Jun. 25-29, 2005, 2 pages, (Abstract).

Middleton et al., "Shale gas and non-aqueous fracturing fluids: Opportunities and challenges for supercritical CO 2," Applied Energy, 147: 500-509, 2015, 10 pages.

Montgomery and Smith, "Hydraulic Fracturing: History of Enduring Technology," Journal of Petroleum Technology, Dec. 2010, 7 pages.

Montgomery, "Chapter 1: Fracturing Fluids," in Effective and Sustainable Hydraulic Fracturing, Intech, the proceedings of the International Conference for Effective and Sustainable Hydraulic Fracturing (HF2103) on May 20-22, 2013, 23 pages.

Montgomery, "Chapter 2: Fracturing Fluid Components," in Effective and Sustainable Hydraulic Fracturing, Intech, 2013, 21 pages.

Moyer, "A Case for Molecular Recognition in Nuclear Separations: Sulfate Separation from Nuclear Wastes," American Chemical Society (ACS), Inorganic Chemistry, 2012, 52: 3473-3490, 18 pages.

(56) References Cited

OTHER PUBLICATIONS

Moyner et al., "The Application of Flow Diagnostics for Reservoir Management," SPE 171557, Society of Petroleum Engineers (SPE), SPE Journal, Apr. 2015, 18 pages.

Nguyen and Abousleiman, "Poromechanics Response of Inclined Wellbore Geometry in Chemically Active Fractured Porous Media," Journal of Engineering Mechanics, 135:11, Nov. 2005, 14 pages.

Okiongbo et al., "Changes in Type II Kerogen Density as a Function of Maturity: Evidence from the Kimmeridge Clay Formation," Energy Fuels, 2005, 19: 2495-2499, 5 pages.

Oliver and Pharr, "An improved technique for determining hardness and elastic modulus using load and displacement sensing indentation experiments," Journal of Materials Research, 7:6, Jun. 1992, 20 pages.

Oliver and Pharr, "Measurement of hardness and elastic modulus by instrumented indentation: Advances in understanding and refinements to methodology," Journal of Materials Research, 19:1, Jan. 2004, 18 pages.

Ortega et al., "The Effect of Particle Shape and Grain-Scale Properties of Shale: A Micromechanics Approach," International Journal for Numerical and Analytical Methods in Geomechanics, 34: 1124-1156, 2010, 33 pages.

Ortega et al., "The Effect of the Nanogranular Nature of Shale on their Poroelastic Behavior," Acta Geotechnica, 2: 155-182, 2007, 28 pages.

Ortega et al., "The Nanogranular Acoustic Signature of Shale," Geophysics, 74:3 (D65-D84), May-Jun. 2009, 20 pages.

Osman and Pao, "Mud Weight Predition for Offshore Drilling," 8 pages.

Ottesen, "Wellbore Stability in Fractured Rock," IADC/SPE 128728, International Association of Drilling Contractors (IADC), Society of Petroleum Engineers (SPE), presented at the 2010 IADC/SPE Drilling Conference and Exhibition, Louisiana, Feb. 2-4, 2010, 8 pages.

Pant, "Nanoindentation characterization of clay minerals and clay-based hybrid bio-geomaterials," dissertation for degree of Doctor of Philosophy in the Department of Civil and Environmental Engineering at the Louisiana State University and Agricultural and Medical College, Dec. 2013, 111 pages.

Passey et al., "From Oil-Prone Source Rock to Gas-Producing Shale Reservoir—Geologic and Petrophysical Characterization of Unconventional Shale-Gas Reservoirs," SPE 131350, Society of Petroleum Engineers (SPE), presented at the CPS/SPE International Oil & Gas Conference and Exhibition, Jun. 8-10, 2010, 29 pages.

Patel et al., "Analysis of US Hydraulic Fracturing Fluid System and Proppant Trends," SPE 168645, Society of Petroleum Engineers (SPE), presented at the SPE Hydraulic Fracturing Technology Conference, Feb. 4-6, 2014, 20 pages.

Petoud et al., "Brilliant SM, Eu, Tb, and Dy Chiral Lanthanide Complexes with Strong Circularly Polarized Luminescence," Journal for the American Chemical Society (JACS), 129: 77-83, Dec. 15, 2006, 7 pages.

Petrowiki.org [online], "Fluid flow in naturally fractured reservoirs," retrieved from URL <https://petrowiki.org/Fluid_flow_in_naturally_fractured_reservoirs>, available on or before Jul. 16, 2015, retrieved on Nov. 11, 2019, 12 pages.

Podio et al., "Dynamic Properties of Dry and Water-Saturated Green River Shale under Stress," SPE 1825, Society of Petroleum Engineers (SPE), presented at the SPE 42nd Annual Fall Meeting, Oct. 1-4, 1967, Society of Petroleum Engineers Journal, Jun. 11, 1968, 16 pages.

Pollard et al., "Fundamentals of Structural Geology," Cambridge University Press, Sep. 1, 2005, 291, 3 pages.

Pollock and Hammiche, "Micro-thermal analysis: techniques and applications," Journal of Physics D: Applied Physics, 34.9 (R23-R53), 2001, 31 pages.

Poon et al., "An Analysis of Nanoindentation in Linearly Elastic Solids," International Journal of Solids and Structures, 45:24 (6018-6033), Dec. 1, 2008, 16 pages.

Qin et al., "Applicability of nonionic surfactant alkyl poly glucoside in preparation of liquid CO2 emulsion," Journal of CO2 Utilization, 2018, 26: 503-510, 8 pages.

Rajbanshi et al., "Sulfate Separation from Aqueous Alkaline Solutions by Selective Crystallization of Alkali Metal Coordination Capsules," American Chemical Society Publications (ACS), Crystal Growth and Design, 2011, 11: 2702-2706, 5 pages.

Ribeiro and Sharma, "Fluid Selection for Energized Fracture Treatments," SPE 163867, Society of Petroleum Engineers (SPE), presented at the SPE Hydraulic Fracturing Technology Conference, Feb. 4-6, 2013, 11 pages.

Richard et al, "Slow Relaxation and Compaction of Granular Systems," Nature Materials, 4, Feb. 2005, 8 pages.

Rodriguez et al., "Imagining techniques for analyzing shale pores and minerals," National Energy Technology Laboratory, Dec. 2, 2014, 44 pages.

Rostami et al., "DABCO tribromide immobilized on magnetic nanoparticle as a recyclable catalyst for the chemoselective oxidation of sulfide using H2O2 under metaland solvent-free condition," Catal. Commun. 2014, 43: 16-20, 20 pages.

Rowan et al., "Dynamic Covalent Chemistry," Angewante Chemie International Edition, 41: 898-952, Mar. 15, 2002, 55 pages.

Ryoo et al, "Water-in-Carbon Dioxide Microemulsions with Methylated Branched Hydrocarbon Surfactants," Industrial & Engineering Chemistry Research 2003, 42:25 (6348-6358), 11 pages.

Sagisaka et al, "A New Class of Amphiphiles Designed for Use in Water-in-Supercritical CO2 Microemulsions," Langmuir 2016, 32:47 (12413-12422), 44 pages.

Sagisaka et al, "Effect of Fluorocarbon and Hydrocarbon Chain Lengths in Hybrid Surfactants for Supercritical CO2," Langmuir 2015, 31:27 (7479-7487), 36 pages.

Sagisaka et al, "Nanostructures in Water-in-CO2 Microemulsions Stabilized by Double-Chain Fluorocarbon Solubilizers," Langmuir 2013, 29:25 (7618-7628), 11 pages.

Santarelli et al., "Drilling through Highly Fractured Formations: A Problem, a Model, and a Cure," Society of Petroleum Engineers (SPE), presented at the 67th Annual Technical Conference and Exhibition of the Society of Petroleum Engineers, Washington D.C., Oct. 4-7, 1992, 10 pages.

Sayed and Al-Muntasheri, "A Safer Generation of Wettability Alteration Chemical Treatments," SPE-184566-MS, Society of Petroleum Engineers (SPE), presented at the SPE International Conference on Oilfield Chemistry, Apr. 3-5, 2017, 25 pages.

Selvin et al., "Principles and biophysical applications of lanthanide-based probes," Annual Review of Biophysics and Biomolecular Structure, Jun. 2002, 31:275-302, 28 pages.

Sepulveda et al., "Oil-Based Foam and Proper Underbalanced-Drilling Practices Improve Drilling Efficiency in a Deep Gulf Coast Well," SPE 115536, Society of Petroleum Engineers (SPE), presented at the 2008 SPE Annual Technical Conference and Exhibition in Denver, Colorado, Sep. 21-24, 2008, 8 pages.

Serra, "No Pressure Transient Analysis Methods for Naturally Fractured Reservoirs," (includes assosciated papers 12940 and 13014), Journal of Petroleum Technology, Dec. 1983, 35:12, Society of Petroleum Engineers, 18 pages.

Serres-Piole et al., "Water tracers in oilfield applications: Guidelines," Elsevier Ltd., Journal of Science and Engineering, Nov. 2012, 98-99:22-39, 18 pages.

Shahid et al., "Natural-fracture reactivation in shale gas reservoir and resulting microseismicity," SPE 178437, Journal of Canadian Petroleum Technology, Nov. 2015, 54:06, 10 pages.

Shin et al., "Development and Testing of Microcompression for Post Irradiation Characterization of ODS Steels," Journal of Nuclear Materials, 2014, 444:43-48, 6 pages.

Shook et al., "Determining Reservoir Properties and Flood Performance from Tracer Test Analysis," SPE 124614, Society of Petroleum Engineers (SPE), presented at SPE Annual Technical Conference and Exhibition, Oct. 4-7, 2009, 19 pages.

Shukla et al., "Nanoindentation Studies on Shales," ARMA 13-578, American Rock Mechanics Association (ARMA), presented at the 47th US Rock Mechanics/Geomechanics Symposium, Jun. 23-26, 2013, 10 pages.

(56) References Cited

OTHER PUBLICATIONS

Sierra et al., "Woodford Shale Mechanical Properties and the Impacts of Lithofacies," ARMA 10-461, American Rock Mechanics Association (ARMA), presented at the 44th US Rock Mechanics Symposium and 5th US-Canada Rock Mechanics Symposium, Jun. 27-30, 2010, 10 pages.

Singh et al., "Facies classification based on seismic waveform," presented at the 5th Conference & Exposition on Petroleum Geophysics, Jan. 15-17, 2004, 456-462, 7 pages.

Siskin et al., "Reactivity of organic compounds in hot water: geochemical and technological implications," Science, Oct. 11, 1991, 254, 8 pages.

Slatt et al., "Merging Sequence Stratigraphy and Geomechanics for Unconventional Gas Shales," The Leading Edge, Special Section: Shales, Mar. 2011, 8 pages.

Slatt et al., "Outcrop/Behind Outcrop (Quarry), Multiscale Characterization of the Woodford Gas Shale," in Breyer, Shale Reservoirs—Giant Resources for the 21st Century: AAPG Memoir, 2011, 97: 1-21, 22 pages.

Sone et al., "Mechanical Properties of Shale-Gas Reservoir Rocks—Part 2: Ductile Creep, Brittle Strength, and Their Relation to the Elastic Modulus," Geophysics, Sep.-Oct. 2013, 78:5 (D393-D402), 10 pages.

Sone et al., "Mechanical Properties of Shale-Gas Reservoir Rocks—Part 1: Static and Dynamic Elastic Properties and Anisotropy," Geophysics, Sep.-Oct. 2013, 78:5 (D381-D392), 13 pages.

Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 136: 6838-6841, 4 pages.

Soni, "LPG-Based Fracturing: An Alternative Fracturing Technique in Shale Reservoirs," IADC/SPE-170542-MS, Society of Petroleum Engineers (SPE), IADC/SPE Asia Pacific Drilling Technology Conference, Aug. 25-27, 2014, 7 pages.

Stiles et al., "Surface-enhanced Raman Spectroscopy," Annual Review of Analytical Chemistry, Mar. 18, 2008, 1:601-26, 29 pages.

Tabatabaei et al., "Well performance diagnosis with temperature profile measurements," SPE 147448, Society of Petroleum Engineers (SPE), in SPE Annual Technical Conference and Exhibition, Oct. 30-Nov. 2, 2011, published Jan. 2011, 16 pages.

Tathed et al., "Hydrocarbon saturation in Bakken Petroleum System based on joint inversion of resistivity and dielectric dispersion logs," Fuel, Dec. 2018, 233: 45-55, 11 pages.

Tian et al., "Off-Resonant Gold Superstructures as Ultrabright Minimally Invasive Surface-Enhanced Raman Scattering (SERS) Probes," American Chemical Society (ACS), Chemistry of Materials (CM), Jul. 2015, 27: 5678-5684, 7 pages.

Trippetta et al., "The seismic signature of heavy oil on carbonate reservoir through laboratory experiments and AVA modelling," Journal of Petroleum Science and Engineering, 2019, 177: 849-860, 12 pages.

Ulboldi et al., "Rock strength measurement on cuttings as input data for optimizing drill bit selection," SPE 56441, Society of Petroleum Engineers (SPE), presented at the 1999 SPE Annual Technical Conference and Exhibition, Oct. 3-6, 1999, 9 pages.

Uleberg and Kleppe, "Dual Porosity, Dual Permeability Formulation for Fractured Reservoir Simulation," TPG4150, Reservoir Recovery Techniques, Combined Gas/Water Injection Subprogram, 1996, 12 pages.

Ulm et al., "Material Invariant Poromechanics Properties of Shales," 2005, 8 pages.

Ulm et al., "The Nanogranular Nature of Shale," Acta Geotechnica, Springer, Jun. 15, 2006, 1:2, 12 pages.

Vanlandingham, "Review of Instrumented Indentation," Journal of Research of the National Institute of Standards and Technology, Jul.-Aug. 2003, 108:4 (249-265), 17 pages.

Vernik et al., "Ultrasonic Velocity and Anisotropy of Hydrocarbon Source Rocks," Geophysics, May 1992, 57:5 (727-735), 9 pages.

Walters et al., "Kinetic rheology of hydraulic fracturing fluids," SPE 71660, Society of Petroleum Engineers (SPE), SPE Annual Technical Conference and Exhibition, Sep. 30-Oct. 3, 2001, 12 pages.

Wang et al, "A Feasibility Analysis on Shale Gas Exploitation with Supercritical Carbon Dioxide," Energy Sources, Part A: Recovery, Utilization, and Environmental Effects 2012, 34:15 (1426-1435), 11 pages.

Wang et al. "Iron Sulfide Scale Dissolvers: How Effective Are They?" SPE 168063, Society of Petroleum Engineers (SPE), presented at the SPE Saudi Arabia Section Annual Technical Symposium and Exhibition, May 19-22, 2013, 22 pages.

Wang et al., "A Numerical Study of Factors Affecting the Characterization of Nanoindentation on Silicon," Materials Science and Engineering: A, Feb. 25, 2007, 447:1 (244-253), 10 pages.

Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, 2004, 41:2 (245-253), 9 pages.

Warpinski, "Understanding Hydraulic Fracture Growth, Effectiveness, and Safety Through Microseismic Monitoring," Chapter 6, in Effective and Sustainable Hydraulic Fracturing, Intech, May 17, 2013, 14 pages.

Warren and Root, "The Behavior of Naturally Fractured Reservoirs," SPE 426, Society of Petroleum Engineers (SPE), SPE Journal, Sep. 1963, 3:3 (245-255), 11 pages.

Wegst et al., "Bioinspired Structural Materials," Nature Materials, Jan. 2015, 14, 14 pages.

Wenk et al., "Preferred Orientation and Elastic Anisotropy of Illite-Rich Shale," Geophysics, Mar.-Apr. 2007, 72:2 (E69-E75), 7 pages.

Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.

Wilson and Aifantis, "On the Theory of Consolidation with Double Porosity," International Journal of Engineering Science, 1982, 20:9 (1009-1035), 27 pages.

Wilson et al., "Fracture Testing of Bulk Silicon Microcantilever Beams Subjected to a Side Load," Journal of Microelectromechanical Systems, Sep. 1996, 5:3, 9 pages.

Wu et al., "A reusable biosensor chip for SERS-fluorescence dual mode immunoassay," Proc. SPIE 9543:954317-1, Third International Symposium on Laser Interaction with Matter, LIMIS 2014, May 4, 2015, 6 pages.

Wu et al., "A SERS-Assisted 3D Barcode Chip for High-Throughput Biosensing," Nano Micro Small Journal, Jun. 11, 2015, 11:23 (2798-2806), 9 pages.

Wu et al., "Extraction of kerogen from oil shale with supercritical carbon dioxide: Molecular dynamics simulations," the Journal of Supercritical Fluids, 107: 499-506, Jan. 2016, 8 pages.

Wurster et al., "Characterization of the fracture toughness of microsized tungsten single crystal notched specimens," Philosophical Magazine, May 2012, 92:14 (1803-1825), 23 pages.

Wurzenberger et al., "Nitrogen-Rich Copper(II) Bromate Complexes: an Exotic Class of Primary Explosives," Journal of Inorganic Chemistry, 2018, 57: 7940-7949, 10 pages.

Xu et al., "Anisotropic elasticity of jarosite: A high-P synchrotron XRD study," American Mineralogist, 2010, 95:1 (19-23), 5 pages.

Xu et al., "Measurement of two-photon excitation cross sections of molecular fluorophores with data from 690 to 1050 nm," Journal of the Optical Society of America B, Mar. 1996, 13:3, 11 pages.

Yang et al., "Nanoscale geochemical and geomechanical characterization of organic matter in shale," Nature Communcations, Dec. 19, 2017, 8:2179, 9 pages.

Yoldas, "Alumina gels that form porous transparent Al2O2," Journal of Materials Science, 1975, 10: 1856-1860, 5 pages.

Zamberi et al., "Improved Reservoir Surveillance Through Injected Tracers in a Saudi Arabian Field: Case Study," SPE 166005, Society of Petroleum Engineers (SPE), presented at SPE Reservoir Characterization and Simulation Conference and Exhibition, Sep. 16-18, 2013, 15 pages.

(56) References Cited

OTHER PUBLICATIONS

Zemel, "Chapter 3: Interwell Water Tracers," Tracers in the Oil Field, 43:1, Elsevier Science, Jan. 13, 1995, 47 pages.

Zeszotarski et al., "Imaging and Mechanical Property Measurements of Kerogen via Nanoindentation," Geochimica et Cosmochimica Acta, Oct. 15, 2004, 68:20 (4113-4119), 7 pages.

Zhou et al., "Upconversion luminescent materials: advances and applications," American Chemical Society (ACS), Chemical Reviews, Jan. 14, 2015, 115: 395-465, 71 pages.

Zielinski et al, "A Small-Angle Neutron Scattering Study of Water in Carbon Dioxide Microemulsions," Langmuir 1997, 13:15 (3934-3937), 4 pages.

Zimmerman and Bodvarsson, "Hydraulic Conductivity of Rock Fractures," transport in Porous Media, Jan. 1996, 23: 1-30, 31 pages.

GCC Examination Report issued in Gulf Cooperation Council Appln. No. 2020-40155, dated Sep. 6, 2021, 4 pages.

PCT International Search Report and Written Opinion in International Appln. No. PCT/US2020/043380, dated Nov. 16, 2020, 12 pages.

AlDuailej et al., "CO 2 Emulsified Fracturing Fluid for Unconventional Applications," SPE-177405, Society of Petroleum Engineers, Abu Dhabi International Petroleum Exhibition and Conference held in Abu Dhabi, UAE, Nov. 9-12, 2015, 12 pages.

\* cited by examiner

OXIDIZERS FOR CARBON DIOXIDE-BASED FRACTURING FLUIDS

CROSS-REFERENCE TO RELATED APPLICATIONS

This application claims the benefit of U.S. Provisional Application Ser. No. 62/878,060 filed on Jul. 24, 2019, the entire contents of which are incorporated by reference in its entirety.

TECHNICAL FIELD

This document relates to methods and compositions used in treating subterranean formations for enhancing hydrocarbon fluid recovery.

BACKGROUND

Unconventional source rock reservoirs differ from conventional reservoirs due to the presence of the hydrocarbon source material, that is, a Total Organic Content (TOC) including kerogen, bitumen and other organics. Kerogen is an irregular organic material that often represents 5 to 10 percent by weight (wt %) (10 to 20 percent by volume (vol %)) of a sedimentary source rock formation. In source rock formations, clay and non-clay minerals are woven and compacted together with the kerogen to form a complex hierarchical structure with mechanical and physical parameters similar to other porous natural materials. The polymeric nature of kerogen with its chemomechanical characteristics interwoven with the granular material results in a problematic role that these composite materials play, first in increasing the tensile strength resistance generated during hydraulic fracturing, and second in masking the capacity of the fracture faces to communicate with the main fracture. The interwoven polymer characteristics of kerogen present a challenge that needs to be addressed in optimizing hydraulic fracturing operations and the overall formation productivity.

Early developments in hydraulic fracturing have resulted in fracturing fluids with additives such as polymers or crosslinkers or both. These viscosified fracturing fluids were designed to move and evenly distribute proppant in the main fracture, while other additives, such as polymer breakers, biocides, clay swelling inhibitors, and scale inhibitors, were added to improve the hydraulic fracturing operations. Additionally, slickwater systems have been developed for stimulating unconventional formations. Slickwater incorporates a friction-reducing synthetic polymer, which increases the rate at which stimulation fluids may be pumped. Fracturing fluids incorporating gas or other components to reduce or eliminate water altogether are also used in fracturing operations.

SUMMARY

This disclosure describes organic and inorganic oxidizers for carbon dioxide ($CO_2$)-based hydraulic fracturing fluids.

In some implementations, a method for treating kerogen or organic matter in a subterranean zone includes placing a composition in the subterranean zone. The composition includes carbon dioxide and a fluid including an oxidizer. The fluid is an aqueous fluid. The composition includes an emulsion of carbon dioxide and the aqueous fluid.

In some implementations, a composition for treating kerogen in a subterranean zone includes carbon dioxide and a fluid including an oxidizer. The fluid is an aqueous fluid. The composition includes an emulsion of carbon dioxide and the aqueous fluid.

In some implementations, a method of making a hydraulic fracturing fluid includes adding a quantity of a composition to a hydraulic fracturing fluid. The composition includes carbon dioxide and a fluid including an oxidizer. The fluid is an aqueous fluid. The composition includes an emulsion of carbon dioxide and aqueous fluid. The method further includes mixing the hydraulic fracturing fluid and the composition.

In some implementations, a method of making a kerogen breaking composition includes reacting two or more salts to form a composition with an organic cation and an oxidizing anion, and adding the composition to carbon dioxide ($CO_2$).

The following units of measure have been mentioned in this disclosure:

| Unit of Measure | Full form |
| --- | --- |
| mL | milliliter |
| uL | microliter |
| mmol | millimole |
| g | gram |
| kDa | kilodalton |
| cm | centimeter |
| h | hour |
| ° C. | degree Celsius |
| M.P. | melting point |

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
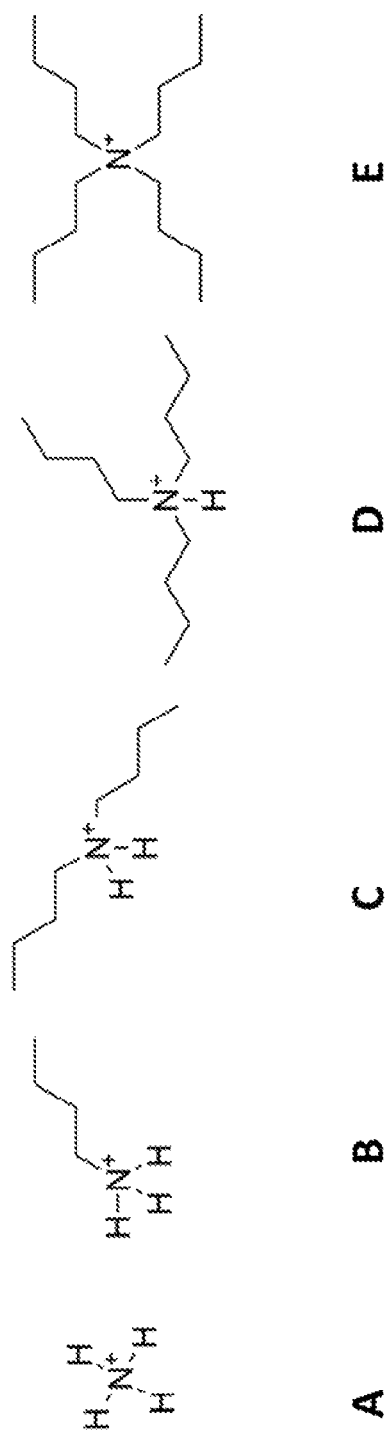
FIG. 1 shows example structures of butylammonium cations.

Reference will now be made in detail to certain implementations of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Provided in this disclosure, in part, are methods, compositions, and systems for degrading organic matter, such as kerogen, in a subterranean formation. Implementations of the disclosure include reactive fluids that can break down the polymeric nature of the kerogen and other organic matter on the hydraulic fracture faces. Water-based fracturing fluids with a reactive nature, which were previously developed for source rock reservoirs, have now been extended to $CO_2$-based systems. A synthetic strategy was developed where oxidizing anions are paired with organic cations that render the oxidizing compounds soluble or dispersible in $CO_2$ while still being reactive towards kerogen. Implementing the strategy can enhance the hydraulic conductivity and formation communication with the main fracture. In this manner, implementations of the disclosure can optimize hydraulic fracturing and overall formation productivity in unconventional source rock reservoirs. Further, these methods, compositions, and systems allow for increased hydraulic fracturing efficiencies in subterranean formations, such as unconventional rock reservoirs.

In some implementations, hydraulic fracturing is performed using a hydraulic fracturing fluid that includes supercritical $CO_2$ or liquid $CO_2$.

This disclosure describes reactive compounds, for example, synthetic oxidizers, which are both soluble in supercritical $CO_2$ or liquid $CO_2$ and capable of degrading organic material such as kerogen. The oxidizers can be directly soluble in $CO_2$ or dispersed in it as droplet or slurry. The oxidizers include both inorganic and organic oxidizers.

In some implementations, these oxidizers include chlorate or bromate which are known to degrade kerogen in combination with organic cations that render the compound soluble or dispersible in $CO_2$.

In some implementations, oxidizers capable of degrading kerogen can be present in an emulsion of aqueous fluid with liquid $CO_2$. The process of making an emulsion of a water-in-$CO_2$ or $CO_2$-in-water containing oxidizers involves dissolving the oxidizer in either water or $CO_2$, providing an emulsifier/surfactant at 0.01 to 2 wt %, followed by introduction of the other solvent (water if the initial solvent was $CO_2$). The oxidizer should be soluble or dispersible in the first phase of the mixing process (for example, sodium bromate in water).

Examples of surfactants suitable for creating emulsions include perfluoropolyethers, polysorbates, and other cationic and anionic surfactants. For example, water-in-$CO_2$ emulsions can be formed by perfluoropolyether ammonium carboxylate surfactants with molecular weights of 500 to 10,000 Da, for example, compounds with the general formula $CF_3-(O-CF_2-CF(CF_3))_n-(O-CF_2)-COO^- NH_4^+$. These surfactants are highly soluble in $CO_2$ (>5 wt %) and less soluble in water (<0.01 wt %).

In another example, beta-lactoglobulin can form $CO_2$-in-water emulsions at pressures between 40-100 bar.

Polysorbates such as polysorbate 80 can be used to form $CO_2$-in-water and water-in-$CO_2$ emulsions. At pressures up to 250 bar and temperatures between 25-60° C., $CO_2$-in-water emulsions are formed for water concentrations at or greater than 10%. On the addition of NaCl or other inorganic salts, the surfactant partitions away from water towards $CO_2$ and water-in-$CO_2$ emulsions are formed. Other cationic-anionic surfactants can be used to form water-in-$CO_2$ emulsions, such as [$C_6F_{13}$methylimidazolium][$C_6F_{13}$S], [$C_5F_{11}$methylimidazolium][$C_5F_{11}$S], [$C_6F_{13}$methylimidazolium][$(CF_3)_3$S]. $C_6F_{13}$methylimidazolium, $C_5F_{11}$methylimidazolium, [$C_6F_{13}$S], [$C_5F_{11}$S] and [$(CF_3)_3$S] are shown in Table 1, where the abbreviation "mim" represents methylimidazolium.

TABLE 1

Chemical Structures of Surfactant Ions

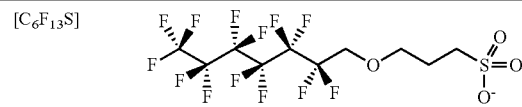

[$C_6F_{13}$S]

TABLE 1-continued

Chemical Structures of Surfactant Ions

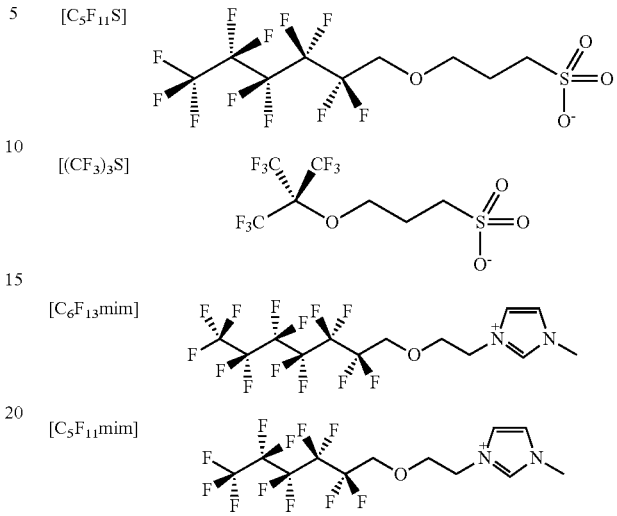

[$C_5F_{11}$S]

[$(CF_3)_3$S]

[$C_6F_{13}$mim]

[$C_5F_{11}$mim]

Other surfactants that are used to form water-in supercritical $CO_2$ microemulsions are sodium 1-oxo-1-[4-(perfluorohexyl)phenyl]hexane-2-sulfonate and 1-oxo-1-[4-(hexyl)phenyl]-2-hexanesulfonates.

In some implementations, an emulsion of aqueous fluid and liquid $CO_2$ can include the aqueous fluid as the internal phase and the liquid $CO_2$ as the external phase. The emulsion can include hydrophobic particles, including but not limited to particles of polytetrafluoroethylene, carbon black, or pulverized coal, where the hydrophobic particles stabilize the emulsion.

In some implementations, an emulsion of aqueous fluid and liquid $CO_2$ can include the liquid $CO_2$ as the internal phase and the aqueous fluid as the external phase. The emulsion can include hydrophilic particles including but not limited to limestone, silica, fly ash, shale, or magnesium silicate to stabilize the emulsion. The compositions described within this disclosure can be used as a kerogen control material to break down, dissolve, or remove all or parts of the kerogen in or near the areas to be hydraulically fractured in a subterranean formation. Using a composition described within this disclosure, the kerogen or other organic matter (or both) can be broken down by, for example, pumping the composition into a subterranean formation.

Figure 2:
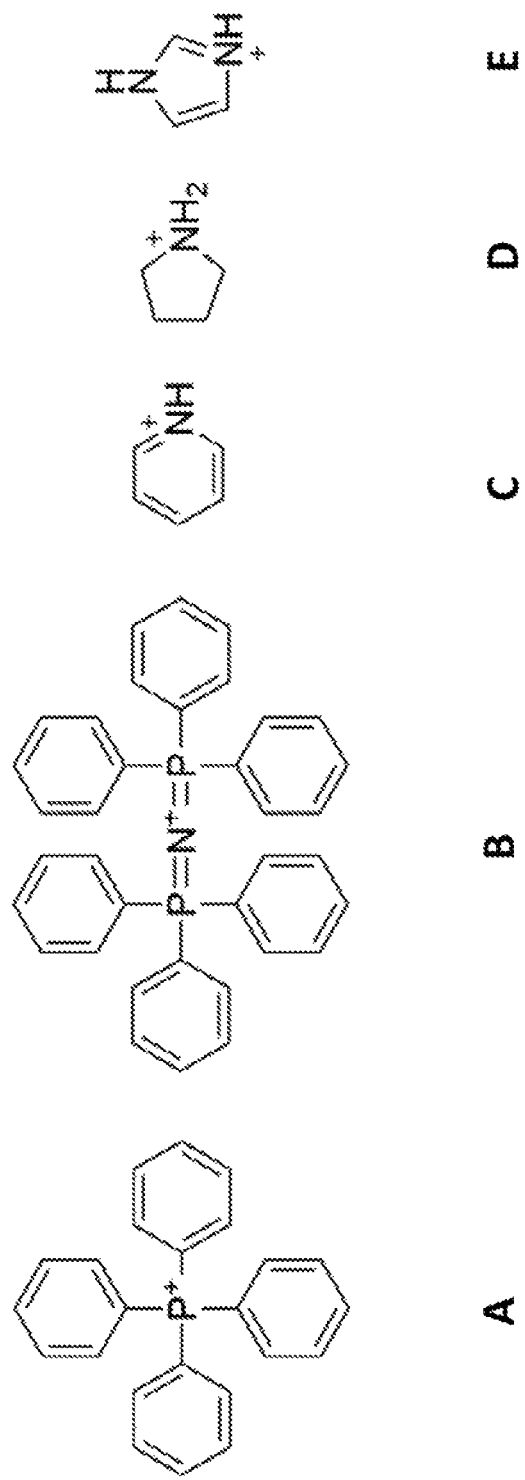
FIG. 2 shows example structures of organic cations.

The compounds soluble in $CO_2$ include oxidizers. The oxidizers can include organic cations and oxidizing anions. For example, organic cations include but are not limited to ammonium ($NH_4^+$) substituted with methyl, ethyl, propyl, hexadecyl and phenyl groups, and butylammonium cations, such as $BuNH_3^+$, $Bu_2NH_2^+$, $Bu_3NH^+$ and $Bu_4N^+$. FIG. 1 shows some example structures from the butylammonium cations, including unsubstituted $NH_4^+$ (FIG. 1A), $BuNH_3^+$ (FIG. 1B), $Bu_2NH^{2+}$ (FIG. 1C), $Bu_3NH^+$ (FIG. 1D) and $Bu_4N^+$ (FIG. 1E). Other organic cations suitable for pairing with oxidizing anions include tetraphenylphosphinium [$Ph_4P$]$^+$, bis(triphenylphosphine)iminium [PPN]$^+$, pyridinium [Pyr]$^+$, pyrrolidinium [Pyrr]$^+$, and imidazolium [Im]$^+$. FIG. 2 shows some example structures of these organic cations, including tetraphenylphosphinium [$Ph_4P$]$^+$ (FIG. 2A), bis(triphenylphosphine)iminium [PPN]$^+$ (FIG. 2B), pyridinium [Pyr]$^+$ (FIG. 2C), pyrrolidinium [Pyrr]$^+$ (FIG. 2D), and imidazolium [Im]$^+$ (FIG. 2E). These organic cations can also be further substituted, with additional functional groups, for example, 1-butyl-3-methyl-imidazolium [BMIm]$^+$. In addition, the organic cations can be partially or fully fluorinated. Suitable oxidizing anions include but are not limited to chlorate and bromate.

In addition, compounds soluble in $CO_2$ include organic peroxides, such as hydroperoxides, peroxy acids and esters, diacyl peroxides, and dialkylperoxides.

The compounds soluble in water include aqueous oxidizers including, for example, sodium bromate, potassium bromate, sodium chlorate, potassium chlorate, sodium chlorite, potassium chlorite, sodium perchlorate, potassium perchlorate, sodium persulfate, ammonium persulfate, potassium persulfate, sodium perborate, potassium perborate, sodium percarbonate, potassium percarbonate, sodium hypochlorite, potassium hypochlorite, sodium nitrite, potassium nitrite, ammonium nitrite, sodium nitrate, potassium nitrate, ammonium nitrate, calcium peroxide, magnesium peroxide, hydrogen peroxide, or any combination of them.

In addition, organic oxidizers as described in any of the other implementations can also be used in an emulsion with liquid $CO_2$. The organic oxidizers as described in any of the other implementations can also be dissolved or dispersed in $CO_2$, or dissolved or dispersed in a fluid including $CO_2$.

Depending on the exact nature of the cation and anions combined, the resulting salt can be either a solid or liquid at room temperature.

The concentration of the components of the composition (for example, the oxidizers, ions, fine particles, or a combination of the same) can depend on the quantity of kerogen or other organic matter in the reservoir rock. For example, the concentration of the oxidizer in the composition can be increased for formations in response to the quantity of organic matter to be removed or partially removed.

The composition can also include other fracturing fluid additives including but not limited to polymer, crosslinker, surfactant, clay inhibitor, scale inhibitor, corrosion inhibitor.

Polymers can be added to viscosify the $CO_2$. Suitable polymers include fluorinated or oxygenated polymers which can self-assemble or are crosslinked. In some implementations, polymers can be added at a concentration of 0.1-10 wt %. Crosslinkers can optionally be added based on the specific polymer used, and can be used to crosslink polymers to add more viscosity.

Surfactants in the composition can enhance flowback of fluid from the reservoir to the surface. Suitable surfactants include zwitterionic/amphoteric surfactants, for example betaine, phosphobetaine, and sultaine. Suitable surfactants also include cationic surfactants, for example quaternary ammonium compounds, anionic surfactants, for example alkyl sarcosinate or alkyl sulfonate, or non-ionic surfactants, for example amido amino oxides. In some implementations, surfactants are added at 0.01-2 wt %.

Clay inhibitors in the composition can prevent clay swelling in the presence of water. Clay inhibitors include quaternary ammonium compounds. As some of the oxidizers used in the composition include quaternary ammonium compounds (for example, tetramethylammonium bromate and tetramethylammonium chloride), the organic component of the oxidizers can serve as a clay inhibitor. Alternatively, the clay inhibitor may consist of a polyamine, quaternary ammonium compound, or alkali metal salt. In some implementations, clay inhibitors are added to the composition at 0-5 wt %, preferably 0-1 wt %.

Scale inhibitors in the composition can prevent precipitation of minerals in the formation as a result of the composition interacting with the rock and its native brine. Scale inhibitors include polyphosphates, phosphate esters, polyacrylic acid derivatives, and chelating agents, for example, EDTA. In some implementations, scale inhibitors are added to the composition at 0-5 wt %, preferably 0-1 wt %.

Corrosion inhibitors in the composition can prevent corrosion of well tubulars by the composition components, for example the oxidizers. Corrosion inhibitors include amides, imidazolines, salts of nitrogenous bases, nitrogen quaternaries, polyoxylated amines, polyoxylated amides, polyoxylated imidazolines, mercaptan modified products, nitrogen heterocyclics, carbonyl compounds, silicate-based inhibitors, and thioacetals. In some implementations, corrosion inhibitors can be added to the composition at 0-5 wt %, for example, 0-1 wt %.

The composition can further include a fracturing fluid or a pad fluid and can be pumped into a subterranean formation before fracturing, during fracturing, or both. In some implementations, the release of the composition including oxidizers can be delayed from a carrier fluid. Delaying the release of the composition from a carrier fluid can be accomplished by encapsulating the composition. In some implementations, the composition can be encapsulated with coatings through which the composition can be slow-released, for example, where the coating slowly degrades so that the encapsulated composition is released a fraction at a time, rather than all at once. Alternatively, or in addition, the coatings can break during fracture closure to release the composition. The composition can be a solid or a powder that can be encapsulated. A delayed release of the composition can decrease corrosion issues (for example, in metal tubing in the wellbore through which the fluids are delivered to the formation) and polymer degradation in the treating fluid. The polymers subject to degradation include, for example, friction reducers.

In some implementations, one or more fluids are placed in the subterranean zone, for example alternating between placing the composition and placing a second fluid.

Figure 3:
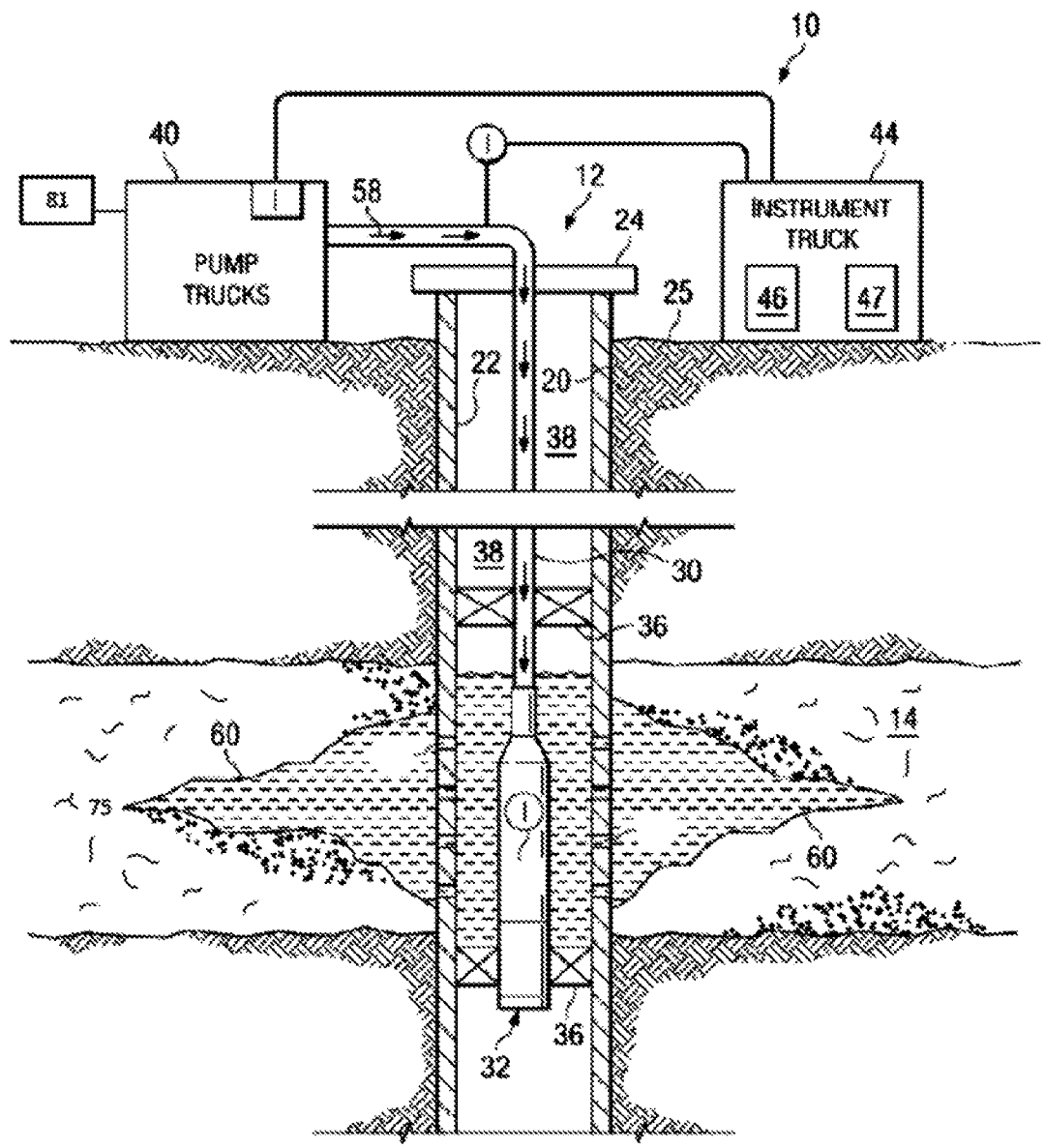
FIG. 3 shows an example of a fracture treatment for a well.

FIG. 3 illustrates an example of a fracture treatment 10 for a well 12. The well 12 can be a reservoir or formation 14, for example, an unconventional reservoir in which recovery operations in addition to conventional recovery operations are practiced to recover trapped hydrocarbons.

The well 12 can include a well bore 20, casing 22 and well head 24. The well bore 20 can be a vertical or deviated bore.

For the fracture treatment 10, a work string 30 can be disposed in the well bore 20. A fracturing tool 32 can be coupled to an end of the work string 30. Packers 36 can seal an annulus 38 of the well bore 20 above and below the formation 14.

One or more pump trucks 40 can be coupled to the work string 30 at the surface 25. The pump trucks 40 pump fracture fluid 58 down the work string 30 to perform the fracture treatment 10 and generate the fracture 60. The fracture fluid 58 can include a fluid pad, proppants and/or a flush fluid.

One or more instrument trucks 44 can also be provided at the surface 25. The instrument truck 44 can include a fracture control system 46 and a fracture simulator 47. The fracture control system 46 monitors and controls the fracture treatment 10.

A quantity of energy applied by the fracture control system 46 to generate the fractures 60 in the reservoir or formation 14 can be affected not only by the properties of the reservoir rock in the formation but also by the organic matter (for example, kerogen 75) intertwined within the rock matrix. As discussed within this disclosure, kerogen in a reservoir can increase the tensile strength of the rock, for example, by as much as 100-fold, resulting in a corresponding increase in the ultimate tensile strength of the rock. The high modulus of toughness of the rock-kerogen combination compared to the rock alone can require a large quantity of energy to generate fractures in such a reservoir. Moreover, the presence of kerogen in the reservoir can affect production as well. For example, the rubber-like properties of elastomeric kerogen has a high elasticity, which can prematurely close fractures resulting in a decrease in production. Accordingly, the presence of kerogen in a subterranean formation can decrease an efficiency of hydraulic fracturing treatments.

This specification describes compositions 81 to degrade the kerogen encountered in subterranean formations, such as at the openings of cracks in hydraulic fractures. The compositions can include hydraulic fracturing fluids (for example, the fracture fluid 58) that are flowed through the subterranean formation (for example, a reservoir). As or after the kerogen is degraded, a quantity of energy to generate and propagate fractures in the subterranean formation (for example, a reservoir) can decrease, thereby increasing an efficiency (for example, cost, time, long-term effect) of the fracturing process. In addition, fracture length and formation surface exposure after wellbore shut-in can be greater than corresponding parameters in reservoirs in which the kerogen has not been degraded. In addition, removing or partially removing the kerogen and other organic matter from the near fracture zone can decrease the propensity for the fractures to close (reheal) after the pressure is released from pumping the fracturing, thereby improving the overall productivity of the well.

This application describes the creation of synthetic organic oxidizers that are soluble or dispersible in $CO_2$. The synthetic alkylammonium bromates and chlorates described in this application can be created by a double displacement reaction of $[RR'_3N]_2SO_4$ with $BaXO_3$ to yield $[RR'_3N]XO_3$ and $BaSO_4$ (R=alkyl, R'=H, alkyl, X=Br, Cl).

Example 1, Preparation of Tetrabutylammonium Bromate ($[Bu_4N]BrO_3$)

In a 250 mL Erlenmeyer flask, 0.9 g (2.29 mmol) of barium bromate ($Ba(BrO_3)_2$) were added to 100 mL of deionized water (DI $H_2O$) and the mixture was stirred. To this mixture was added 2.66 g of a 50 wt % tetrabutylammonium sulfate solution (2.29 mmol). The mixture instantly turned a milky white. The mixture was stirred for 3 hours. The mixture was then allowed to stand for 20 hours. The mixture was then filtered to remove barium sulfate ($BaSO_4$). The reaction yield of the product, $[Bu_4N]BrO_3$, was 1.66 g (99% yield). Infrared spectroscopy of the product revealed the following spectrum: wavenumber ($\upsilon$), $cm^{-1}$=2950 (vs), 2905 (vs), 2840 (vs), 2740 (w), 2100 (w, br), 1650 (s), 1480 (vs), 1385 (s) 1290 (w), 1250 (w), 1170 (m), 1100 (s) 1060 (s) 1020 (m), 880 (s), 800 (vs). Melting point analysis of the product revealed a melting point of 54° C. In the previous sentence, "vs," "s," "m," "w," "sh," and "br" stand for very strong, strong, moderate, weak, sharp and broad, respectively.

Example 2, Preparation of Tributylammonium Bromate ($[Bu_3NH]BrO_3$)

In a 125 mL Erlenmeyer flask, 0.5 mL (2.1 mmol) of tributylamine was added to 20 mL of DI $H_2O$. Next, 57 µL of 98% sulfuric acid ($H_2SO_4$) (1.1 mmol) was added to the mixture. Then, the mixture was sonicated for 5 minutes. The result was a tributylammonium sulfate solution. Separately, 0.42 g (1.1 mmol) of $Ba(BrO_3)_2$ were added to 80 mL of DI $H_2O$. This mixture was sonicated for 5 minutes. The tributylammonium sulfate solution was then added rapidly to the $Ba(BrO_3)_2$ solution. The resulting mixture was sonicated for 30 minutes. Then the mixture was vacuum filtered twice to give a clear solution. Water was then removed under vacuum. The product, $[Bu_3NH]BrO_3$, was a colorless liquid at room temperature. Infrared spectroscopy of the product revealed the following spectrum: $\upsilon$ ($cm^{-1}$)=3430 (m, br), 2960 (st), 2935 (m), 2873 (m), 1722 (vw), 1628 (m), 1460 (m), 1381 (w), 1066 (w), 786 (vs, sh), 768 (vs), 740 (s, sh).

Example 3, Preparation of Dibutylammonium Bromate ($[Bu_2NH_2]BrO_3$)

In a 125 mL Erlenmeyer flask, 0.5 mL (3.3 mmol) of dibutylamine was added to 20 mL of DI $H_2O$. To this mixture was added 88 uL of 98% $H_2SO_4$ (1.6 mmol). The resulting mixture was sonicated for 5 minutes, resulting in a dibutylammonium sulfate solution. Separately, 0.64 g (1.6 mmol) of $Ba(BrO_3)_2$ were added to 80 mL of deionized $H_2O$ and sonicated for 5 minutes. Then, the dibutylammonium sulfate solution was added rapidly to the $Ba(BrO_3)_2$ solution. The resulting mixture was sonicated for 30 minutes. Next, the mixture was vacuum filtered twice to give a clear solution. Water was removed from the solution under vacuum. The resulting product, $[Bu_2NH_2]BrO_3$, is a colorless liquid at room temperature. Infrared spectroscopy of the product revealed the following spectrum: $\upsilon$ ($cm^{-1}$)=3430 (m, br), 2960 (st), 2935 (m), 2873 (m), 1722 (vw), 1628 (m), 1617 (m), 1460 (m), 1381 (w), 1066 (w), 915 (w), 780 (vs), 727 (vs). Melting point analysis of the product revealed a melting point of 4° C.

Example 4, Preparation of Butylammonium Bromate, $[BuNH_3]BrO_3$

In a 125 mL Erlenmeyer flask, 0.33 mL (3.3 mmol) of butylamine were added to 20 mL of DI $H_2O$. To this mixture was added 88 uL of 98% $H_2SO_4$, (1.6 mmol). The resulting mixture was sonicated for 5 minutes, to yield a butylammonium sulfate solution. Separately, 0.64 g (1.6 mmol) of $Ba(BrO_3)_2$ were added to 80 mL of DI $H_2O$ and sonicated for 5 minutes. Then, the butylammonium sulfate solution was rapidly added to the $Ba(BrO_3)_2$ solution. The resulting mixture was sonicated for 30 minutes and vacuum filtered twice to give a clear solution. Water was removed from the solution under vacuum. The yield of the product, $[BuNH_3]BrO_3$, was 0.65 g (97% yield). Infrared spectroscopy of the product revealed the following spectrum: $\upsilon$ ($cm^{-1}$)=3041 (st, br), 2960 (st), 2935 (m), 2875 (m), 1606 (m), 1600 (m), 1570 (s), 1174 (m), 1077 (m), 915 (m), 830 (s), 768 (vs), 757 (vs).

Example 5, Preparation of Tetrabutylammonium Chlorate ($[Bu_4N]ClO_3$)

In a 250 mL Erlenmeyer flask, 0.76 g (2.29 mmol) of barium chlorate ($Ba(ClO_3)_2$) was added to 100 mL of DI $H_2O$ and the mixture was stirred. To this mixture was added 2.66 g of a 50 wt % tetrabutylammonium sulfate solution (2.29 mmol). The mixture instantly turned a milky white. The mixture was stirred for 3 hours. Then, the mixture was allowed to stand for 20 hours. The mixture was then filtered to remove the $BaSO_4$. The yield of the product, $[Bu_4N]ClO_3$, was 0.73 g (98% yield). Infrared spectroscopy of the product revealed the following spectrum: $\upsilon(cm^{-1})$=2960 (m), 2935 (m), 2875 (m), 1476 (w), 1472 (w), 1381 (w), 1650 (s), 954 (vs), 930 (vs), 881 (m), 800 (w), 740 (m). Melting point analysis revealed a melting point of 116-118° C.

Example 6, Preparation of bis(Triphenylphosphine)iminium Bromate ([PPN]BrO$_3$)

In a 120 mL glass tube, 4.0 g (26.5 mmol) of sodium bromate (NaBrO$_3$) were dissolved in 30 mL of DI H$_2$O. To this solution was added 1.0 g (1.86 mmol) of bis(triphenylphosphine)iminium chloride and the solution was heated at 100° C. for 15 minutes without stirring. Over the course of this time, a liquid formed and collected at the bottom of the tube. Upon cooling, this material crystallized and was isolated by filtration. Recrystallization of this material in 15 mL of DI H$_2$O yielded 0.88 g of the product, [PPN]BrO$_3$ (71% yield). Infrared spectroscopy of the product revealed the following spectrum: IR (cm$^{-1}$), $\upsilon$=3170 (w) 3150 (w) 3040 (s) 3010 (s), 2990 (s) 2700 (w) 2600 (w) 2230 (w) 2100 (w), 2080 (w), 2050 (w) 2000 (w), 1900 (w), 1830 (w), 1800 (w), 1780 (w) 1670 (w) 1600 (vs), 1480 (vs), 1420 (vs) 1300 (vs, br), 1190 (vs) 1100 (vs), 1020 (vs), 1000 (vs) 930 (w), 840 (vs), 790 (vs). Melting point analysis revealed a melting point of 236-238° C.

Example 7, Preparation of Pyridinium Bromate, ([PyrH]BrO$_3$)

First, 0.5 mL (6.6 mmol) of pyridine was added to 10 mL of DI H$_2$O. Next, 180 uL of concentrated H$_2$SO$_4$ (18.4 M) was added to the solution. The solution was stirred for two hours. This solution was then added to a second solution of 1.3 g (3.3 mmol) of Ba(BrO$_3$)$_2$ in 120 mL of water. The resulting mixture was sonicated for two hours. Then, the mixture was allowed to settle and was vacuum filtered. The water was removed with a rotary evaporator. The product, [PyrH]BrO$_3$, was a colorless liquid. The yield of the product was 1.36 g (98% yield).

Figure 4:
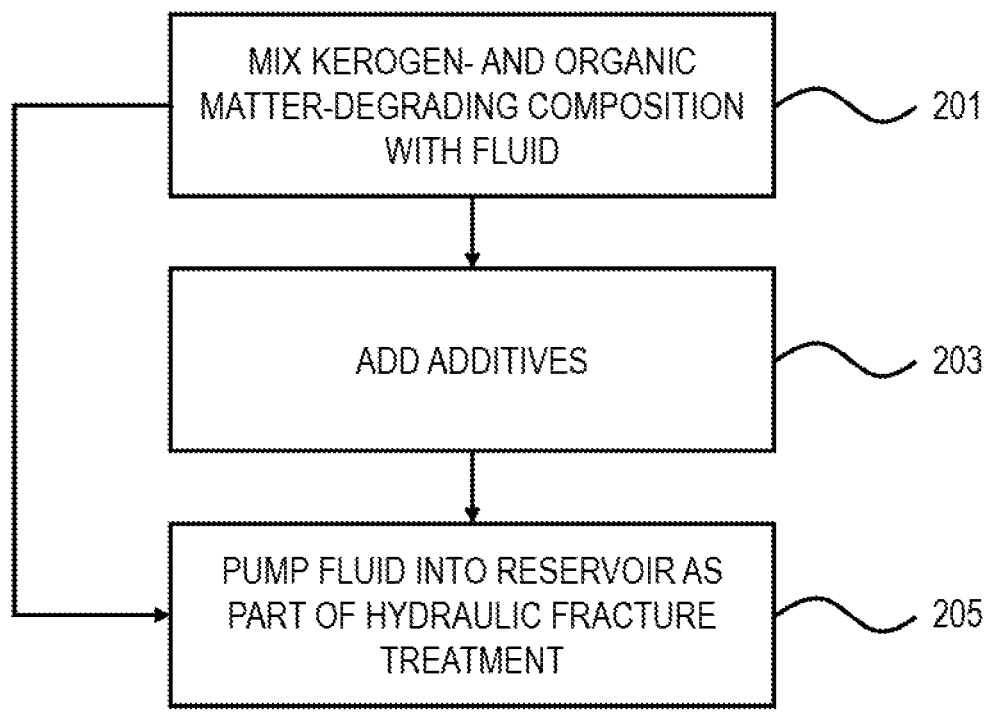
FIG. 4 is a flow chart of an example method for treating a well.

FIG. 4 is a flowchart of an example of a process 200 for degrading kerogen in a subterranean zone. The process can be implemented using different types of hydraulic fracturing fluids, for example, fracturing fluid including aqueous oxidizers, with or without proppant; fracturing fluids including organic oxidizers, with or without proppant; fracturing fluids including an emulsified oxidizer, with or without proppant; fracturing fluid including aqueous, organic, or emulsified oxidizers pumped with nanoproppant; or fracturing fluid including aqueous, organic, or emulsified oxidizers pumped with degradable nanoparticles such as poly(lactic acid) (PLA) or poly(glycolic acid) (PGA). At 201, a kerogen- and organic matter-degrading composition (for example, a composition including an oxidizer, such as an alkylammonium bromate) is mixed with a fluid. The fluid can be a hydraulic fracture fluid or a pad fluid that is flowed into the reservoir before the hydraulic fracture fluid (or both). At 205, the fluid (with the kerogen- and organic matter-degrading composition) is flowed into the reservoir as part of a hydraulic fracture treatment. As described previously, the kerogen and organic matter degrade upon reacting with the composition. At 203, an additive, such as polymer, crosslinker, breaker, surfactant, scale inhibitor, corrosion inhibitor, or flowback aid, can be added to the mixture of the composition and the fluid before pumping the fluid into the reservoir at 205.

Other potential additives include any material that is compatible with the kerogen- and organic matter-degrading composition.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, hydrocarbons, ionic liquids, and supercritical fluids.

The term "room temperature" as used in this disclosure refers to a temperature of about 15 degrees Celsius (° C.) to about 28° C.

The term "downhole" as used in this disclosure refers to under the surface of the earth, such as a location within or fluidly connected to a wellbore.

As used in this disclosure, the term "fracturing fluid" refers to fluids or slurries used downhole during fracturing operations.

As used in this disclosure, the term "fluid" refers to liquids and gels, unless otherwise indicated.

As used in this disclosure, the term "subterranean material" or "subterranean zone" refers to any material under the surface of the earth, including under the surface of the bottom of the ocean. For example, a subterranean zone or material can be any section of a wellbore and any section of a subterranean petroleum- or water-producing formation or region in fluid contact with the wellbore. Placing a material in a subterranean zone can include contacting the material with any section of a wellbore or with any subterranean region in fluid contact the material. Subterranean materials can include any materials placed into the wellbore such as cement, drill shafts, liners, tubing, casing, or screens; placing a material in a subterranean zone can include contacting with such subterranean materials. In some examples, a subterranean zone or material can be any downhole region that can produce liquid or gaseous petroleum materials, water, or any downhole section in fluid contact with liquid or gaseous petroleum materials, or water. For example, a subterranean zone or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

In some implementations, a method for treating kerogen or organic matter in a subterranean zone includes placing a composition in the subterranean zone. The composition includes carbon dioxide and a fluid including an oxidizer. The fluid is an aqueous fluid. The composition includes an emulsion of carbon dioxide and the aqueous fluid.

This aspect, taken alone or combinable with any other aspect, can include the following features. The method further includes alternating placing the composition in the subterranean zone with placing a second fluid in the subterranean zone.

This aspect, taken alone or combinable with any other aspect, can include the following features. The oxidizer includes a cation and an anion.

This aspect, taken alone or combinable with any other aspect, can include the following features. The anion includes at least one of chlorate or bromate.

This aspect, taken alone or combinable with any other aspect, can include the following features. The cation includes at least one of an ammonium ion, a butylammonium ion, a dibutylammonium ion, a tributyl ammonium ion, or a tetrabutylammonium ion.

This aspect, taken alone or combinable with any other aspect, can include the following features. The cation includes at least one of an ammonium ion substituted with alkyl or phenyl groups, bis(triphenylphosphine)iminium, or tetraphenylphosphinium.

This aspect, taken alone or combinable with any other aspect, can include the following features. The cation includes a cationic heterocycle.

This aspect, taken alone or combinable with any other aspect, can include the following features. The cationic heterocycle is at least one of pyridinium, pyrrolidinium, pyrazolium, or imidazolium.

This aspect, taken alone or combinable with any other aspect, can include the following features. The cation is partially or fully fluorinated.

This aspect, taken alone or combinable with any other aspect, can include the following features. The external phase of the emulsion includes aqueous fluid and the internal phase of the emulsion includes carbon dioxide.

This aspect, taken alone or combinable with any other aspect, can include the following features. The emulsion includes hydrophobic particles to stabilize the emulsion.

This aspect, taken alone or combinable with any other aspect, can include the following features. The external phase of the emulsion includes carbon dioxide and the internal phase of the emulsion includes aqueous fluid.

This aspect, taken alone or combinable with any other aspect, can include the following features. The aqueous fluid includes an inorganic oxidizer.

This aspect, taken alone or combinable with any other aspect, can include the following features. The inorganic oxidizer includes at least one of bromate, chlorate, chlorite, persulfate, perborate, percarbonate, hypochlorite, nitrite, nitrate, perchlorate, or peroxide.

This aspect, taken alone or combinable with any other aspect, can include the following features. The emulsion includes an organic oxidizer.

This aspect, taken alone or combinable with any other aspect, can include the following features. The emulsion is stabilized by surfactants or particles.

This aspect, taken alone or combinable with any other aspect, can include the following features. The method further includes flowing the composition into the subterranean zone with a fracturing fluid.

This aspect, taken alone or combinable with any other aspect, can include the following features. The fracturing fluid includes at least one of a polymer, a crosslinker, a breaker, a surfactant, a scale inhibitor, a corrosion inhibitor, or a flowback aid.

This aspect, taken alone or combinable with any other aspect, can include the following features. The method further includes flowing the composition and the fracturing fluid with proppants.

This aspect, taken alone or combinable with any other aspect, can include the following features. The subterranean zone includes carbonate rock or sandstone rock that includes organic matter.

In some implementations, a composition for treating kerogen in a subterranean zone includes carbon dioxide and a fluid including an oxidizer. The fluid is an aqueous fluid. The composition includes an emulsion of carbon dioxide and the aqueous fluid.

This aspect, taken alone or combinable with any other aspect, can include the following features. The oxidizer includes a cation and an anion.

This aspect, taken alone or combinable with any other aspect, can include the following features. The anion includes at least one of chlorate or bromate.

This aspect, taken alone or combinable with any other aspect, can include the following features. The cation includes at least one of an ammonium ion, a butylammonium ion, a dibutylammonium ion, a tributyl ammonium ion, or a tetrabutylammonium ion.

This aspect, taken alone or combinable with any other aspect, can include the following features. The cation includes at least one of an ammonium ion substituted with alkyl, phenyl, or other groups, for example, bis(triphenylphosphine)iminium or tetraphenylphosphinium.

This aspect, taken alone or combinable with any other aspect, can include the following features. The cation includes at least one of pyridinium, pyrrolidinium, pyrazolium or imidazolium.

This aspect, taken alone or combinable with any other aspect, can include the following features. The cation is partially or fully fluorinated.

This aspect, taken alone or combinable with any other aspect, can include the following features. The external phase of the emulsion includes an aqueous fluid and an internal phase of the emulsion includes carbon dioxide.

This aspect, taken alone or combinable with any other aspect, can include the following features. The emulsion includes hydrophilic particles to stabilize the emulsion.

This aspect, taken alone or combinable with any other aspect, can include the following features. The aqueous fluid includes an inorganic oxidizer.

This aspect, taken alone or combinable with any other aspect, can include the following features. The inorganic oxidizer includes at least one of bromate, chlorate, chlorite, persulfate, perborate, percarbonate, hypochlorite, nitrite, nitrate, perchlorate, or peroxide.

This aspect, taken alone or combinable with any other aspect, can include the following features. The emulsion includes an organic oxidizer.

This aspect, taken alone or combinable with any other aspect, can include the following features. The emulsion includes surfactants.

In some implementations, a method of making a hydraulic fracturing fluid includes adding a quantity of a composition to a hydraulic fracturing fluid. The composition includes carbon dioxide and a fluid including an oxidizer. The fluid is an aqueous fluid. The composition includes an emulsion of carbon dioxide and aqueous fluid. The method further includes mixing the hydraulic fracturing fluid and the composition.

In some implementations, a method of making a kerogen breaking composition includes reacting two or more salts to form a composition with an organic cation and an oxidizing anion, and adding the composition to carbon dioxide.

As used in this disclosure, "treatment of a subterranean zone" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, and identifying oil rich regions via imaging techniques.

As used in this disclosure, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some implementations, a flow pathway can be a water source and can include water. In some implementations, a flow pathway can be a petroleum source and can include petroleum. In some implementations, a flow pathway can be sufficient to divert water, a downhole fluid, or a produced hydrocarbon from a wellbore, fracture, or flow pathway connected to the pathway.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

As used in this disclosure, "volume percent" (vol %) can be considered a volume fraction or a volume ratio of a substance to the total mixture or composition.

A number of implementations of the disclosure have been described. Nevertheless, it will be understood that various modifications may be made without departing from the spirit and scope of the disclosure.

What is claimed is:

1. A method for treating kerogen or organic matter in a subterranean zone, the method comprising placing a composition in the subterranean zone, the composition comprising:
   supercritical carbon dioxide ($CO_2$); and
   a fluid comprising an oxidizer, wherein the fluid is an aqueous fluid, and wherein the composition comprises an emulsion of supercritical carbon dioxide and the aqueous fluid, wherein the supercritical carbon dioxide and the fluid comprising the oxidizer are mixed to form the emulsion before placing the composition in the subterranean zone,
   wherein the oxidizer comprises a cation and an anion, and the cation comprises a fluorinated organic cation.

2. The method of claim 1, further comprising alternating placing the composition in the subterranean zone with placing a second fluid in the subterranean zone.

3. The method of claim 1, wherein the anion comprises at least one of chlorate or bromate.

4. The method of claim 1, wherein the cation comprises at least one of an ammonium ion, a butylammonium ion, a dibutylammonium ion, a tributyl ammonium ion, or a tetrabutylammonium ion.

5. The method of claim 1, wherein the cation comprises at least one of: an ammonium ion substituted with alkyl or phenyl groups; bis(triphenylphosphine)iminium; or tetraphenylphosphinium.

6. The method of claim 1, where the cation comprises a cationic heterocycle.

7. The method of claim 6, wherein the cationic heterocycle is at least one of pyridinium, pyrrolidinium, pyrazolium, or imidazolium.

8. The method of claim 1, wherein an external phase of the emulsion comprises the aqueous fluid and an internal phase of the emulsion comprises the supercritical $CO_2$.

9. The method of claim 1, wherein the emulsion comprises hydrophobic particles to stabilize the emulsion.

10. The method of claim 1, wherein an external phase of the emulsion comprises the supercritical $CO_2$ and an internal phase of the emulsion comprises the aqueous fluid.

11. The method of claim 1, wherein the aqueous fluid comprises an inorganic oxidizer.

12. The method of claim 11, wherein the inorganic oxidizer comprises at least one of bromate, chlorate, chlorite, persulfate, perborate, percarbonate, hypochlorite, nitrite, nitrate, perchlorate, or peroxide.

13. The method of claim 1, wherein the emulsion comprises an organic oxidizer.

14. The method of claim 1, wherein the emulsion is stabilized by surfactants or particles.

15. The method of claim 1, further comprising flowing the composition into the subterranean zone with a fracturing fluid.

16. The method of claim 15, wherein the fracturing fluid comprises at least one of a polymer, a crosslinker, a breaker, a surfactant, a scale inhibitor, a corrosion inhibitor, or a flowback aid.

17. The method of claim 15, further comprising flowing the composition and the fracturing fluid with proppants.

18. The method of claim 1, wherein the subterranean zone comprises carbonate rock or sandstone rock comprising organic matter.

19. The method of claim 1, wherein:
   the cation comprises a member selected from the group consisting of tetrabutylammonium bromate, tributylammonium bromate, dibutylammonium bromate, butylammonium bromate, tetrabutylammonium chlorate, bis(triphenylphosphine)iminium bromate, pyridinium bromate; and
   the cation is made by a double displacement reaction.

20. A method for treating kerogen or organic matter in a subterranean zone, the method comprising placing a composition in the subterranean zone, the composition comprising:
   supercritical carbon dioxide ($CO_2$); and
   a fluid comprising an oxidizer, wherein the fluid is an aqueous fluid, and wherein the composition comprises an emulsion of carbon dioxide and the aqueous fluid, wherein an external phase of the emulsion comprises the supercritical $CO_2$ and an internal phase of the emulsion comprises the aqueous fluid, and wherein the supercritical carbon dioxide and the fluid comprising the oxidizer are mixed to form the emulsion before placing the composition in the subterranean zone,
   wherein:
   the oxidizer comprises a cation and an anion;
   the anion comprises at least one of chlorate or bromate;
   the cation comprises a member selected from the group consisting of tetrabutylammonium bromate, tributylammonium bromate, dibutylammonium bromate, butylammonium bromate, tetrabutylammonium chlorate, bis(triphenylphosphine)iminium bromate, pyridinium bromate; and
   the cation is made by a double displacement reaction.

21. A method for treating kerogen or organic matter in a subterranean zone, the method comprising placing a composition in the subterranean zone, the composition comprising:
   supercritical carbon dioxide ($CO_2$); and
   a fluid comprising an oxidizer, wherein the fluid is an aqueous fluid, and wherein the composition comprises an emulsion of supercritical carbon dioxide and the aqueous fluid, wherein the supercritical carbon dioxide and the fluid comprising the oxidizer are mixed to form the emulsion before placing the composition in the subterranean zone,
wherein:
the oxidizer comprises a cation and an anion;
the cation comprises a member selected from the group consisting of tetrabutylammonium bromate, tributylammonium bromate, dibutylammonium bromate, butylammonium bromate, tetrabutylammonium chlorate, bis(triphenylphosphine)iminium bromate, pyridinium bromate; and
the cation is made by a double displacement reaction.

\* \* \* \* \*